United States Patent
Imanaka et al.

(10) Patent No.: US 8,213,159 B2
(45) Date of Patent: Jul. 3, 2012

(54) ELECTRODE FOIL, METHOD OF MANUFACTURING ELECTRODE FOIL, AND ELECTROLYTIC CAPACITOR

(75) Inventors: Yoshihiko Imanaka, Kawasaki (JP); Minoru Funahashi, Sannohe (JP); Hidetoshi Ishizuka, Sannohe (JP); Katsuharu Yamada, Sannohe (JP)

(73) Assignee: Fujitsu Limited, Kawasaki (JP)

( * ) Notice: Subject to any disclaimer, the term of this patent is extended or adjusted under 35 U.S.C. 154(b) by 62 days.

(21) Appl. No.: 12/580,708

(22) Filed: Oct. 16, 2009

(65) Prior Publication Data
US 2010/0165544 A1    Jul. 1, 2010

Related U.S. Application Data

(63) Continuation of application No. PCT/JP2008/001035, filed on Apr. 18, 2008.

(30) Foreign Application Priority Data

Apr. 20, 2007 (JP) ................................. 2007-111569
Apr. 20, 2007 (JP) ................................. 2007-111570

(51) Int. Cl.
*H01G 9/00* (2006.01)
(52) U.S. Cl. ........ 361/523; 361/305; 361/303; 361/525; 361/528; 361/529
(58) Field of Classification Search .......... 361/525–528, 361/516–519, 523, 528–529, 530–534, 502–504, 361/303–305, 509–512; 29/25.01, 25.03
See application file for complete search history.

(56) References Cited

U.S. PATENT DOCUMENTS

| | | | |
|---|---|---|---|
| 5,376,308 A | 12/1994 | Hirai et al. | |
| 6,243,256 B1 * | 6/2001 | Furuta et al. | 361/528 |
| 6,519,137 B1 * | 2/2003 | Nitta et al. | 361/525 |
| 6,707,663 B2 * | 3/2004 | Persico et al. | 361/528 |
| 6,965,508 B2 * | 11/2005 | Takatani et al. | 361/523 |
| 7,006,348 B1 | 2/2006 | Ueda et al. | |
| 7,070,631 B2 * | 7/2006 | Monden et al. | 29/25.03 |
| 7,452,451 B2 * | 11/2008 | Kitada et al. | 204/291 |
| 7,476,904 B2 * | 1/2009 | Fukunaga | 257/80 |
| 7,663,864 B2 * | 2/2010 | Fujimoto et al. | 361/511 |
| 7,940,515 B2 * | 5/2011 | Ozawa | 361/523 |
| 2004/0168929 A1 | 9/2004 | Katsir et al. | |
| 2004/0195093 A1 | 10/2004 | Cohen et al. | |
| 2006/0061940 A1 | 3/2006 | Ueda et al. | |
| 2006/0076243 A1 | 4/2006 | Aoyama et al. | |

FOREIGN PATENT DOCUMENTS

| | | |
|---|---|---|
| JP | 62-15813 A | 1/1987 |
| JP | 01-212425 | 8/1989 |
| JP | 02-117123 A | 5/1990 |

(Continued)

OTHER PUBLICATIONS

Japanese Office Action dated Mar. 13, 2012 for JP Application No. 2007-111569.

(Continued)

*Primary Examiner* — Nguyen T Ha
(74) *Attorney, Agent, or Firm* — Arent Fox LLP

(57) ABSTRACT

An electrode foil includes a structure a structure in which metal particles and ceramic particles, which primarily include at least one of valve metal particles having a dielectric constant and ceramic particles, are deposited on a surface of a metal foil.

20 Claims, 19 Drawing Sheets

FOREIGN PATENT DOCUMENTS

| | | |
|---|---|---|
| JP | 04-186814 A | 7/1992 |
| JP | 05-047589 A | 2/1993 |
| JP | 6-1751 B2 | 1/1994 |
| JP | 08-064481 A | 3/1996 |
| JP | 08-167543 A | 6/1996 |
| JP | 2004-186696 | 7/2004 |
| JP | 2005-109017 A | 4/2005 |
| JP | 2006-108160 A | 4/2006 |
| JP | 2006-135310 A | 5/2006 |
| JP | 3875705 B2 | 11/2006 |
| JP | 2008-016578 A | 1/2008 |
| KR | 1996-0002743 B1 | 2/1996 |
| WO | WO 2005/101972 A2 | 11/2005 |

OTHER PUBLICATIONS

A partial English translation of Japanese Office Action dated Mar. 13, 2012 for JP Application No. 2007-111569.

Chinese Office Action dated Mar. 5, 2012 for Chinese Application No. 200880012854.4.

An English language translation of Chinese Office Action dated Mar. 5, 2012 for Chinese Application No. 200880012854.4.

\* cited by examiner

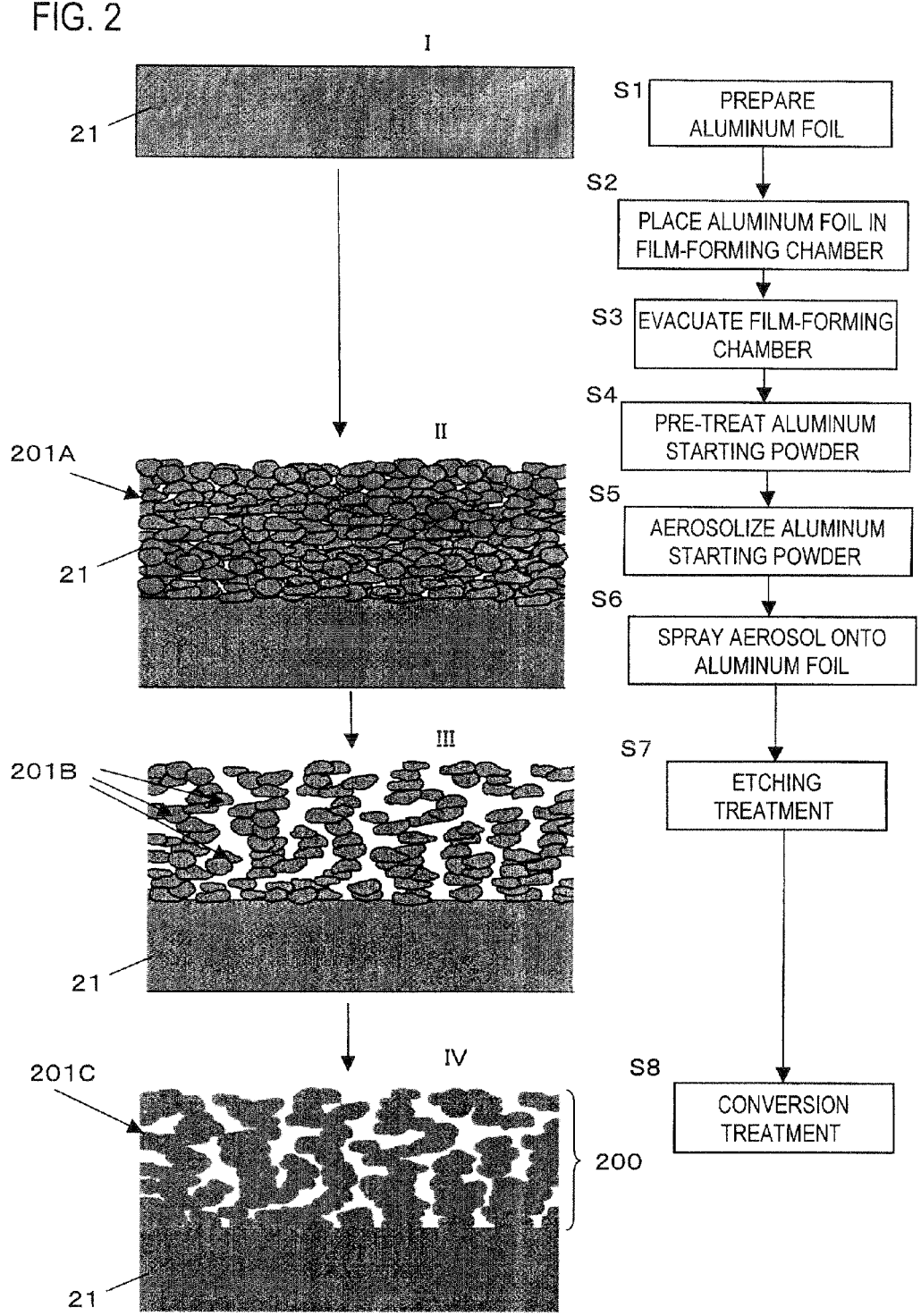

ELECTRODE FOIL, METHOD OF MANUFACTURING ELECTRODE FOIL, AND ELECTROLYTIC CAPACITOR

CROSS-REFERENCE TO RELATED APPLICATIONS

This application is a continuation of International Application No. PCT/JP2008/001035, filed on Apr. 18, 2008, now pending, herein incorporated by reference. Further, this application is based upon and claims the benefit of priority from the prior Japanese Patent Application No. 2007-111569, filed on Apr. 20, 2007, and the prior Japanese Patent Application No. 2007-111570, filed on Apr. 20, 2007 entire contents of which are incorporated herein by reference.

TECHNICAL FIELD

The present invention relates to an electrode foil suitable as the anode foil in an electrolytic capacitor, a method of manufacturing such an electrode foil, and an electrolytic capacitor.

BACKGROUND ART (A) Electrode Foils and Methods of Manufacture Thereof

Aluminum electrode foils for electrolytic capacitors are generally produced using as the starting material at least 98% high-purity aluminum that has been rendered into the form of a foil by rolling. Innumerable pits are formed on the surface of the aluminum foil using a known direct-current electrolytic etching process, an alternating-current electrolytic etching process, or both in alternation, within an acid or alkali solution that dissolves aluminum, thereby enlarging the actual surface area and increasing the electrostatic capacitance.

With such etching methods, a multiplicative effect per unit surface area of several hundred-fold, generally about 300 to 400 times, is achieved.

An advantage of electrolytic capacitors is that, because the dielectric layer is composed of an extremely thin oxide film layer, the electrostatic capacitance per unit surface area of the electrode is high, enabling electrolytic capacitors which are small yet of large capacitance to be obtained. However, with the miniaturization of electronic devices, there exists a need for electrolytic capacitors of even smaller size and higher capacitance.

When attempting to increase the capacitance per unit surface area by etching treatment as described above, the entire aluminum foil becomes filled with etching pits, which makes the electrode foil fragile and lowers the electrode foil strength.

To address this problem, one method for achieving a large electrode foil surface area while maintaining the foil strength is to etch an aluminum foil of substantial thickness and thereby increase the capacitance per unit surface area.

In this method, the capacitance per unit surface area is large, but when such an electrode foil is used to construct a common coiled electrolytic capacitor, the large thickness of the electrode foil places limits on the length of electrode foil that may be used, resulting in the formation of a capacitor element which will not fit within the case.

In addition, in the case of multilayer solid electrolytic capacitors, due to height constraints resulting from the shape, it is hard to make the height too large. In forming the capacitors from a foil with reduced strength such as that mentioned above, it is hard to set the welding conditions for stacking, and problems with the strength after welding also arise.

In thus trying to achieve a higher capacitance, the number of stacked layers may be increased or thick electrode foils may be used, resulting in an increase in the height of the capacitor.

In addition to the general prior art mentioned above, in the case of coiled electrolytic capacitors, as described in Patent Document 1, a method is known which, based on the fact that the capacitance is computed as the composite capacitance, increases the capacitance by forming a vapor-deposited film of metal nitride on a substrate surface. Also, Patent Document 2 discloses a method for achieving an increased capacitance by using foil which has been brought into physical contact with carbon as the cathode to cancel the cathode-side capacitance so that only the anode-side capacitance is reflected in the composite capacitance.

(B) Electrolytic Capacitors

Electrolytic capacitors are electronic components which are widely used in electronic devices, and generally have the following type of construction.

The action of having resistance to a voltage applied in one direction but losing such resistance when a voltage is applied in the opposite direction is called a "valve action." An electrolytic capacitor uses a valve metal (e.g., aluminum) having such a valve action as the anode. By means of treatment such as anodic oxidation, an insulating oxide film is formed on the anode surface.

This oxide film acts as a dielectric layer; an electrolyte such as an electrolytic solution or an electrically conductive polymer, or a solid electrolyte, is in contact with the oxide film substantially as a cathode.

In a coiled capacitor, the electrolyte is held by electrolytic paper (separator) or the like. In a flat-plate capacitor, a carbon paste and metal particles with a resin material are formed on the electrolyte in this order, resulting in a cathode layer.

In each type of electrolytic capacitor, the cathode-side electrode is led out from a cathode made of a metal such as aluminum.

The anode-side electrode and the cathode-side electrode are generally made of foils that have been cut into strips. In a coiled capacitor, the capacitor element is formed by winding the foils together with a separator. In a flat-plate capacitor, the capacitor element is formed by arranging as an anode-side electrode, a cathode layer, and a cathode-side electrode or the like, all of which are of square shape. Stacking together a plurality of such capacitor elements results in a multilayer capacitor.

The cathode layer is connected to a lead-out electrode which is composed primarily of a metal and electrically connects the cathode layer to the exterior, and is thereby led out to the exterior from any of various types of housings which encase the capacitor element.

Here, because the dielectric layer is composed of an extremely thin oxide film layer, the electrolytic capacitor is characterized by a high electrostatic capacitance per unit surface area of the electrode, enabling a small capacitor of large capacitance to be obtained. However, with the miniaturization of electronic devices, smaller sizes and larger capacitances are being demanded even of electrolytic capacitors.

To increase the capacitance of electrolytic capacitors, enlargement of the surface area by using etching treatment or the like to roughen the electrode surface has hitherto been carried out. However, the surface area enlargement by such roughening has been approaching the limit recently, new measures for increasing the electrostatic capacitance are being sought.

For example, by etching an aluminum foil to form countless small pits extending deeply into the inner portion of the aluminum foil in order to increase the capacitance per unit surface area, a larger capacitance per unit surface area may be achieved.

However, when attempting to increase the capacitance per unit surface area in the above manner, the entire aluminum foil becomes filled with etching pits, which makes the electrode foil fragile and lowers the electrode foil strength.

To address this problem, one method for achieving a large electrode foil surface area while maintaining the foil strength is to etch an aluminum foil of substantial thickness and thereby increase the capacitance per unit surface area. In this method, the capacitance per unit surface area is large, but when such an electrode foil is used to construct common coiled electrolytic capacitors, the large thickness of the electrode foil places limits on the length of electrode foil that may be used, resulting in the formation of a capacitor element which will not fit within the case.

In addition, in the case of multilayer solid electrolytic capacitors, due to height constraints resulting from the shape, it is hard to make the height too large. In forming the capacitors from a foil with reduced strength such as that mentioned above, it is hard to set the welding conditions for stacking, and problems with the strength after welding also arise.

In thus trying to increase a higher capacitance, the number of stacked layers may be increased or thick electrode foils may be used, resulting in an increase in the height of the capacitor.

In addition to the general art mentioned above, in the case of coiled electrolytic capacitors, as described in Patent Document 1, a method is known which, based on the fact that the capacitance is computed as the composite capacitance, increases the capacitance by forming a vapor-deposited film of metal nitride on a substrate surface. Also, Patent Document 2 discloses a method for achieving an increased capacitance by using foil which has been brought into physical contact with carbon as the cathode to cancel the cathode-side capacitance so that only the anode-side capacitance is reflected in the composite capacitance.

Patent Document 1: Japanese Laid-open Patent Publication No. 02-117123

Patent Document 2: Japanese Patent No. 3,875,705

DISCLOSURE OF INVENTION

Problems to be Solved by the Invention (A) Electrode Foil and Method of Manufacture However, even when these prior-art methods are used, in the absence of an anode material capable of achieving a large capacitance while retaining a thickness, strength and voltage resistance comparable to what exists today, it will not be possible to obtain an electrolytic capacitor capable of fully addressing the even larger capacitance that will be required henceforth by the market.

It is therefore a first object of the invention to provide an electrode foil structure which is suitable for an anode foil and is capable of dramatically increasing the anode foil surface area that relates to the capacitance of a capacitor while retaining a thickness, strength and voltage resistance comparable to the prior art, and to provide a method of manufacturing such an electrode foil.

(B) Electrolytic Capacitor

As noted above, even when these prior-art methods are used, in the absence of an anode material capable of achieving a large capacitance while retaining a thickness, strength and voltage resistance comparable to what exists today, it will not be possible to obtain an electrolytic capacitor capable of fully addressing the even larger capacitance that will be required henceforth by the market.

Therefore, a second object of the invention is to provide an anodic electrode foil structure which dramatically increases the anode foil surface area that relates to the capacitance of a capacitor while retaining a thickness, strength and voltage resistance comparable to the prior art, and to provide a large-capacitance electrolytic capacitor which uses the same.

Solution to Problem (A) Electrode Foil and Method of Manufacture Thereof

To achieve the above first object, the electrode foil according to the present invention is characterized by having a structure in which metal particles and ceramic particles, which primarily include at least one of valve metal particles having a dielectric constant and ceramic particles, are deposited on a surface of a metal foil.

In addition, the electrode foil is characterized in that the deposit of the metal particles and/or ceramic particles is formed by using aerosol deposition.

Also, to achieve the above first object, the method of manufacturing an electrode foil according to the present invention is characterized by placing an aluminum foil in a film-forming chamber of an aerosol chamber, aerosolizing aluminum powder, and spraying the aerosolized aluminum powder onto the aluminum foil placed in the film-forming chamber so as to deposit aluminum particles on the aluminum foil.

Preferably, on the surface of aluminum foil or on the surface of etched foil obtained by electrolytically etching the surface of aluminum foil, by in this way uniformly diffusing an ultrafine powder having a dielectric constant in a high-velocity gas and spraying the gas onto a surface of metal foil or etched foil serving as the target so as to form a formed film of ultrafine powder, then individually etching the particles of the fine powder, compared with conventional etched foil composed of aluminum alone, the surface area of aluminum may be increased in foil of the same thickness.

(B) Electrolytic Capacitor

To achieve the above second object, a first aspect of the invention provides an electrolytic capacitor having an anode foil composed of a metal with a valve action, a cathode layer, and an electrolyte layer interposed between the anode foil and the cathode layer, the capacitor being characterized in that the anode foil has on a surface thereof a dielectric oxide film layer formed by using an aerosol deposition method to deposit particles having a dielectric constant.

In this first aspect, as a preferred embodiment, the anode foil is a flat rolled aluminum foil or an aluminum foil having a rough, etched surface, and the particles having a dielectric constant in the layer deposited on the anode foil are valve metal particles composed primarily of valve metal.

Also, in this first aspect, as a preferred embodiment, the particles having a dielectric constant in the layer deposited on the anode foil further contain ceramic particles composed primarily of a ceramic.

In the present invention thus constituted, because the electrolytic capacitors may have a layer formed by depositing valve metal particles having a high dielectric constant on the anode foil by an aerosol deposition process, anode foil having a larger surface area per unit surface area of the anode foil than etched anode foils used in conventional electrolytic capacitors may be obtained.

Therefore, an electrolytic capacitor in which such an anode foil is used as an anodic electrode has a high electrolytic capacitance compared with prior-art electrolytic capacitors, enabling a small, high-capacitance electrolytic capacitor to be obtained.

By additionally etching the above layer of valve metal particles deposited by an aerosol deposition process and the above anode foil, it is possible to increase the surface area of the deposited layer and the anode foil, enabling the capacitance of the electrolytic capacitor to be made even higher. The anode foil may also be subjected to etching treatment prior to the particle deposition step by aerosol deposition as described above.

By subjecting the treated electrode foil to conversion treatment at a suitable applied voltage, it is possible to ensure voltage resistance. Moreover, compared with conventional etched and conversion-treated foil, there is also the advantage that the thickness of the deposited layer of valve metal particles may be adjusted by adjusting the blowing velocity and blowing time in the aerosol deposition process, making it possible to adjust the capacitance.

By employing anode foil fabricated by such a manufacturing process as the anode foil in coiled electrolytic capacitors, single-layer capacitors and multilayer capacitors, it is possible to achieve a larger capacitance in these capacitors.

BRIEF DESCRIPTION OF THE DRAWINGS

FIG. 2 is a flow chart illustrating the sequence of steps in a method of manufacturing an electrode foil in a first embodiment according to the invention.

BEST MODE FOR CARRYING OUT THE INVENTION

Embodiments of the present invention are described below in conjunction with the diagrams.

(A) Electrode Foil and Method of Manufacture Thereof

FIG. 1 is a schematic view illustrating the structure of a coiled electrolytic capacitor serving as an embodiment in which an electrode foil according to the invention is employed as an anode foil.

Figures 1A, 1B:
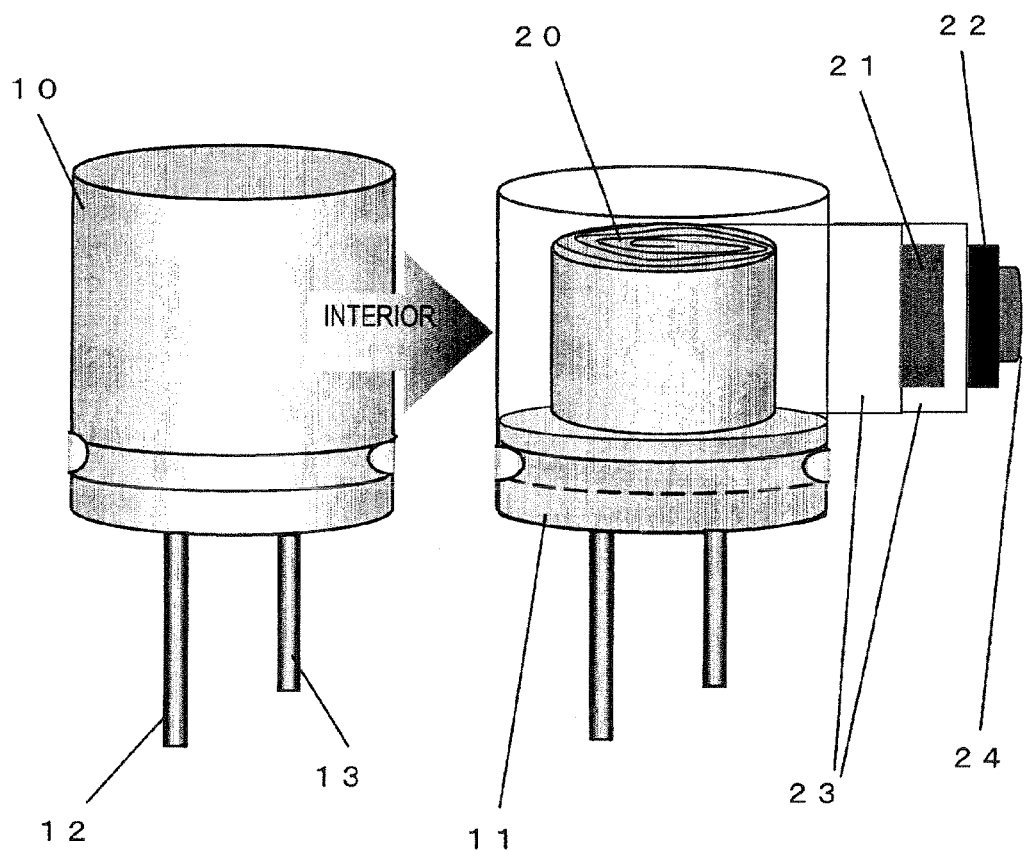
FIG. 1 is a schematic view illustrating the structure of a coiled electrolytic capacitor serving as an embodiment in which an electrode foil according to the invention is employed as an anode foil.

FIG. 1A illustrates the outside appearance of the capacitor, and FIG. 1B illustrates a perspective view to the interior with the housing (metal case) 10 removed. An anodic electrode lead 12 and a cathodic electrode lead 13 are fixed to a sealant (insulating resin) 11.

A wound capacitor element 20 is fixed to the sealant (insulating resin) 11 within the housing (metal case) 10, and the anodic electrode lead 12 and the cathodic electrode lead 13 are electrically connected to, respectively, an anode foil 21 (which is an electrode foil according to the invention) and a cathode foil 22.

The anode foil 21 and the cathode foil 22 are cylindrically coiled with electrolytic paper 23 as a separator therebetween, and the final ends of the foils are fixed with tape 24 to maintain the coiled state.

Electrolytic capacitors which use the electrode foil of the invention achieve a higher capacitance than electrolytic capacitors of prior-art construction which use an etched electrode foil obtained by electrolytically etching the aluminum foil intended for use as the anode foil.

Also, the electrode foil according to the invention is characterized by having a structure obtained by uniformly dispersing in a high-velocity gas an ultrafine powder of metal having a particle size in a range of from 100 nm to 100 μm, an ultrafine powder including the above ultrafine powder of metal and/or an oxide, a nitride or a carbide having a high dielectric constant of 10 or more, or an ultrafine powder of valve metal that has been oxidized at the surface and has a particle size of 500 nm or less, and spraying the resulting gas onto the surface of the etched electrode foil serving as the target, so as to form a formed film of the ultrafine powder on the surface of a prior-art metal foil or an etched metal foil obtained by etching a prior-art metal foil.

The above valve metal particles include at least one from among valve metal aluminum and compounds thereof, titanium and compounds thereof, tantalum and compounds thereof, and niobium and compounds thereof.

With the foregoing construction, compared with conventional etched electrode foil composed of aluminum foil alone, electrode foil in which the surface area of aluminum has been increased may be obtained in electrode foil of the same thickness. In addition, a formed film of ultrafine powder that has been formed on the surface of the etched electrode foil may be electrolytically etched.

With such treatment, compared with conventional etched electrode foil composed of aluminum foil alone, by means of this invention, electrode foil in which the surface area of aluminum has been increased may be obtained in electrode foil of the same thickness.

Owing to this characteristic constitution of electrode foil according to the present invention, by using the foil as an anode foil, it is possible to provide a electrolytic capacitor having a smaller size and a higher capacitance.

The distinctive features of the electrode foil and the method of manufacture thereof according to the present invention are described in greater detail below based on the following embodiments.

First Embodiment
(An Embodiment in which a Film of Fine Aluminum Particles is Formed on Conventional Aluminum Foil)

FIG. 2 is a flow chart illustrating the sequence of steps in a method of manufacturing an electrode foil in a first embodiment according to the invention. Illustrations of the states corresponding to the treatment steps are illustrated on the left side of the flow chart.

Aluminum foil 21 (purity, 99%) having a thickness of 40 µm was prepared by rolling (Step S1: State I).

Figure 3:
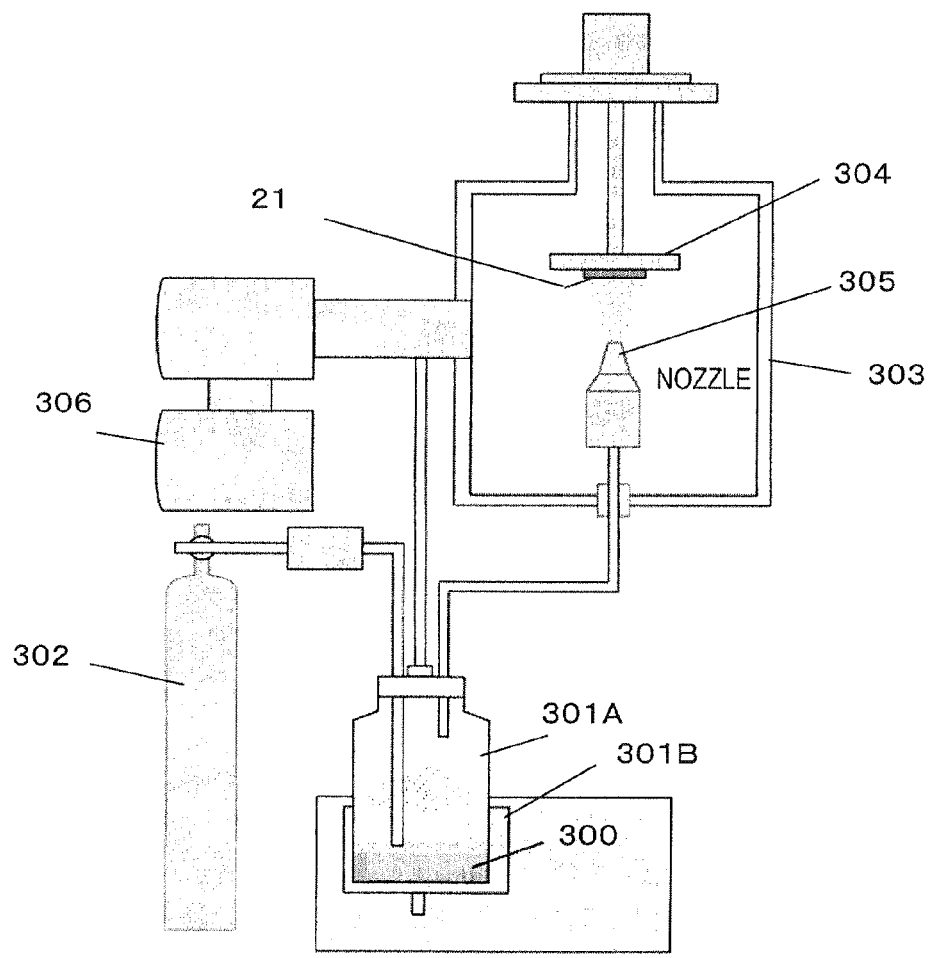
FIG. 3 is a schematic diagram of an exemplary aerosol deposition chamber configuration.

Surface treatment on the aluminum foil 21 thus prepared was carried out as follows in an aerosol deposition chamber. FIG. 3 is a schematic diagram of an exemplary aerosol deposition chamber configuration.

A film-forming chamber 303 has a stage 304 which is movable in the X and Y directions in the interior thereof. The rolled aluminum foil 21 prepared in Step S1 is affixed to the stage 304 (Step S2).

The interior of the film-forming chamber 303 was evacuated using a vacuum pump 306, thereby lowering the pressure beforehand to 10 Pa or below (Step S3).

In a separate operation, a starting powder 300 composed primarily of a powder of aluminum, which is a valve metal, having an average particle size of 8 µm was placed in an aerosol generator 301A, ultrasound was applied to the entire aerosol generator 301A by an oscillator 301B, and degassing in vacuum was carried out for 30 minutes while heating at about 150° C., thereby effecting pretreatment in which moisture that had formed on the powder surface is removed (Step S4).

High-purity helium gas (gas pressure, 2 kg/cm$^2$; gas flow rate, 10 L/min) 302 was introduced into the aerosol generator 301A, and the pretreated starting powder 300 was aerosolized (Step S5).

Next, this aerosol was passed through a pipe and delivered to the film-forming chamber 303 by a nozzle 305. The nozzle 305 used was one having a helical groove formed on the inside. Spraying was carried out for 3 minutes from a nozzle 305 having a helical groove on the inside toward the aluminum foil substrate 21 (Step S6). The pressure within the chamber at this time was fixed at 500 Pa.

The aluminum film 201A, which was formed of fine particles of aluminum on the top surface of the aluminum foil substrate 21 by aerosol deposition in this way, had a thickness of 20 µm (State II: aerosol deposition with fine aluminum particles).

It is also possible to form an aluminum film on both sides of the aluminum foil substrate 21 by the same procedure.

Next, annealing the deposited aluminum metal particle in an inert gas at 300° C., which is a temperature at or below the melting point of aluminum+100° C., thereby carrying out sintering pretreatment in which the deposited aluminum metal particles are densified. This foil was electrolytically treated for 8 minutes in an aqueous solution of hydrochloric acid, nitric acid and AlCl$_3$ at a current density of 0.2 A/m$^2$ (50 Hz), thereby carrying out roughening treatment (etching) (Step S7). This etching treatment resulted in the formation of a microcavity layer 201B (State III).

Next, conversion treatment was carried out in an aqueous solution of ammonium borate/ammonium adipate (Step S8).

Such treatment enlarges the surface area by forming a microcavity layer 201B, in addition the surface 201C of the microcavity layer 201B is oxidized by the conversion treatment in Step S8, resulting in the formation of a dielectric oxide film layer 200 having a large dielectric constant on the surface of the aluminum foil substrate 21 (State IV).

Hence, as illustrated by IV in FIG. 2, a structure, where metal particles are stacked with gaps which are smaller than the metal particles, is formed on the surface of the metal foil, making it possible to achieve a structure in which an oxide film is formed on the surface of the metal particles.

The leak current of the dielectric oxide film layer 200, which was formed by the treatment process in FIG. 2, was measured after an applied voltage had reached to predetermined voltage of 20 V and 30 minutes had passed thereafter. In addition, the tensile strength of the film was measured.

The tensile strength was measured by cutting out test pieces having a width of 1 cm and a length of 5 cm, and subjecting the test pieces to strain on a tensile testing machine at a test rate of 10 mm/min. If the strength at break was 1.5 kg/cm (not normalized by thickness; this value is specified based on the two-dimensional shape of the test piece) or more, the piece was rated as acceptable.

Second Embodiment
(An Embodiment in which a Film of Fine Aluminum Particles is Formed on Etched Aluminum Foil)

Figure 4:
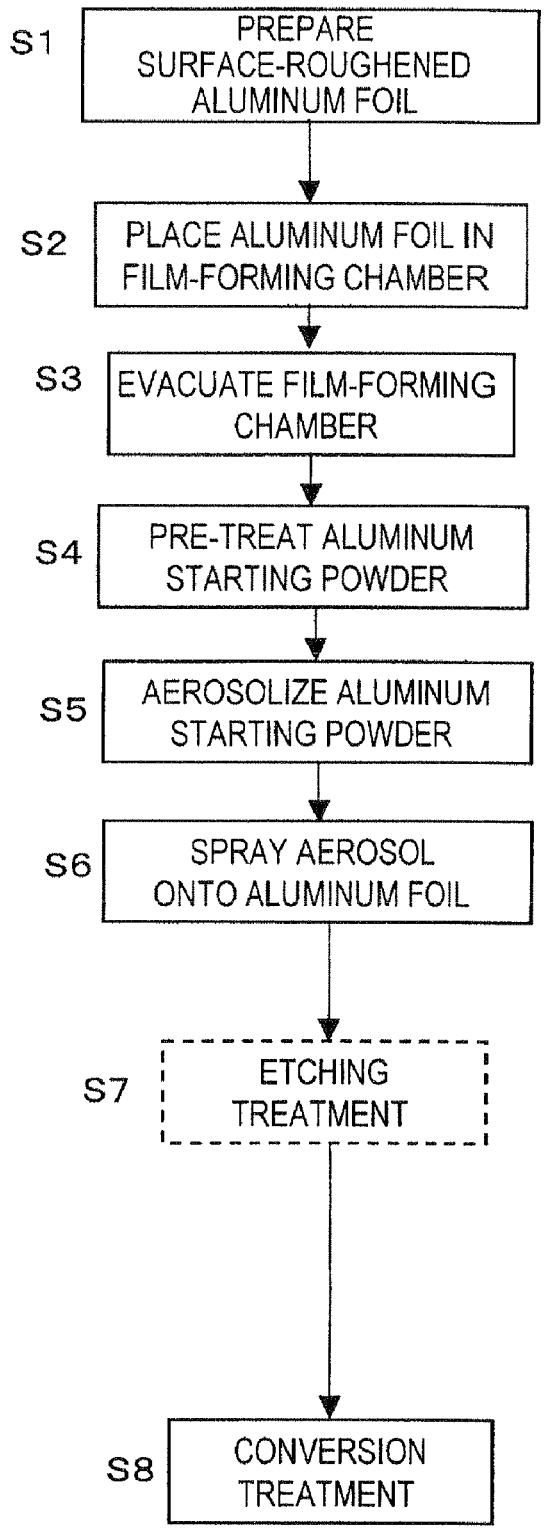
FIG. 4 is a flow chart illustrating the sequence of steps in a method of manufacturing an electrode foil in a second embodiment according to the invention.
Figure 5A:
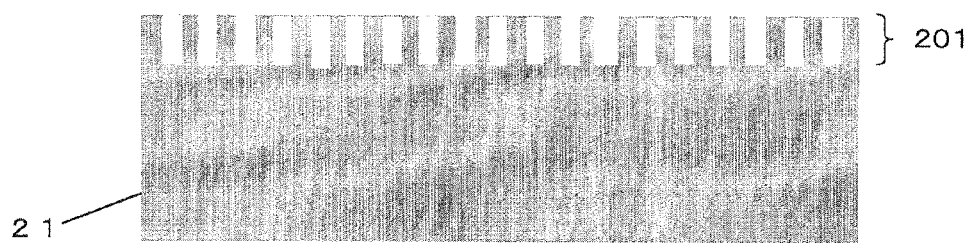
FIG. 5A is a first diagram illustrating aluminum foil having a rough, pre-etched surface (etched surface).

FIG. 4 is a flow chart illustrating the sequence of steps in a method of manufacturing an electrode foil in a second embodiment according to the invention. In the first embodiment according to the flow chart in FIG. 2 above, an example was described in which 99% aluminum foil substrate 21 having a thickness of 40 µm obtained by rolling was used as the electrode foil. As a second embodiment, an etched aluminum foil with a rough surface (etched surface) 201 subjected beforehand to etching treatment as illustrated in FIG. 5A, which has also been used in the prior art, was used.

That is, 99% aluminum foil having a thickness of 40 µm obtained by rolling was annealed at 300° C. in an inert gas, thereby carrying out pretreatment. This foil was electrolytically treated for 8 minutes at a current density of 0.2 A/m$^2$ (50 Hz) in an aqueous solution of hydrochloric acid, nitric acid and AlCl$_3$, thereby carrying out surface roughening treatment. In this way, an aluminum foil 21 having the etched surface 201 illustrated in the aluminum foil cross-section in FIG. 5A was obtained (Step S1).

Next, the roughened aluminum foil was subjected to the treatments in Steps S2 to S8 in the same way as the treatment sequence in FIG. 2 explained earlier for the first embodiment. However, the etching treatment in Step S7 of FIG. 2 was omitted.

It is also possible to form an aluminum film on both sides of the foil by the above procedure.

Figure 5B:
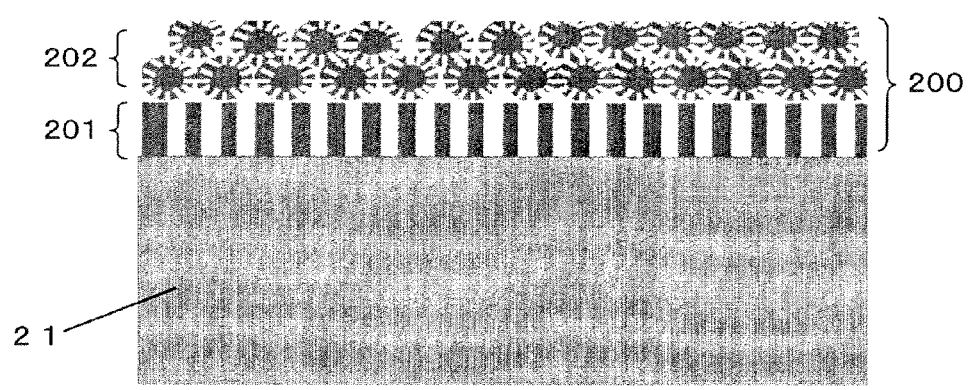
FIG. 5B is a second diagram illustrating aluminum foil having a rough, pre-etched surface (etched surface).

FIG. 5B schematically illustrates the cross-section of a layer 202 obtained as described above using aerosol deposition to deposit fine particles of aluminum on a rough surface 201 that was subjected to etching treatment beforehand.

As in the first embodiment, the leakage current 30 minutes after reaching a predetermined voltage of 20 V was measured.

The tensile strength was measured by cutting out test pieces having a width of 1 cm and a length of 5 cm, and subjecting them to strain on a tensile testing machine at a test rate of 10 mm/min. If the strength at break was 1.5 kg/cm (not normalized by thickness; this value is specified based on the two-dimensional shape of the test piece) or more, the piece was rated as acceptable. In addition, the tensile strength of the film foil was measured.

Third Embodiment
(An Embodiment in which a Film of Fine Ceramic Particles is Formed on Etched Aluminum Foil)

Figure 6:
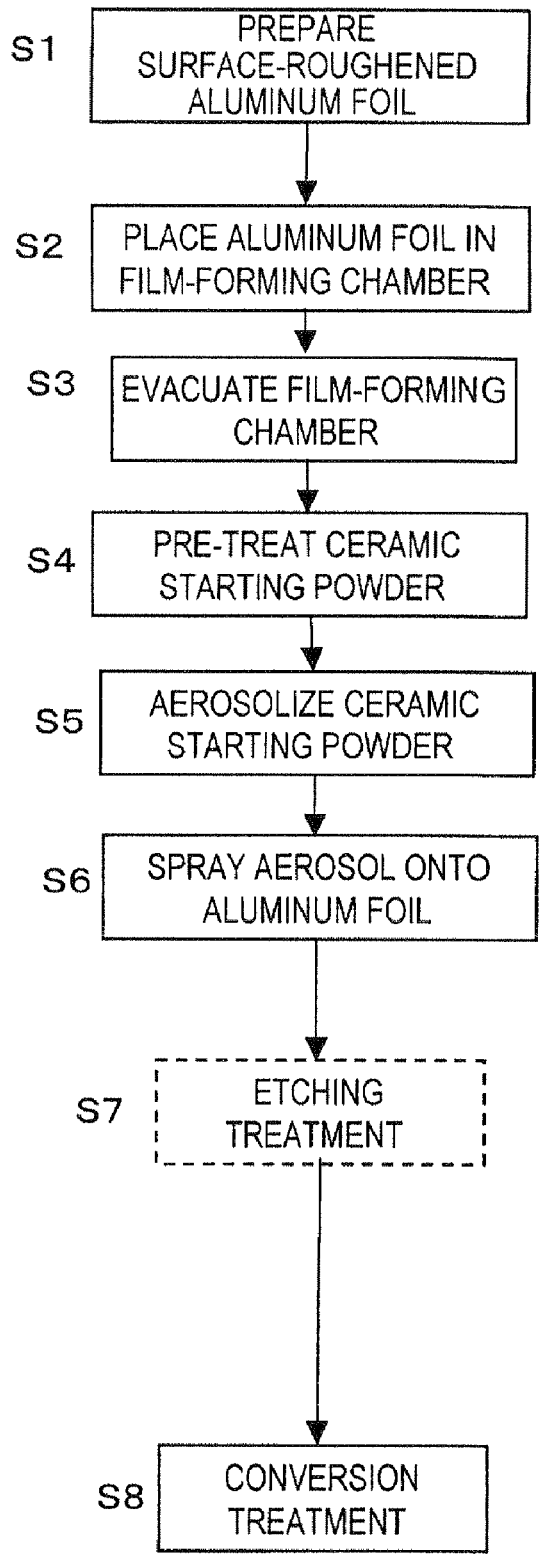
FIG. 6 is a flow chart illustrating the sequence of steps in a method of manufacturing an electrode foil in a third embodiment according to the invention.

FIG. 6 is a flow chart illustrating the sequence of steps in a method of manufacturing an electrode foil in a third embodiment according to the invention. As in the second embodiment, 99% aluminum foil having a thickness of 40 μm obtained by rolling was annealed at 300° C. in an inert gas, thereby carrying out pretreatment. This foil was electrolytically treated for 8 minutes at a current density of 0.2 A/m$^2$ (50 Hz) in an aqueous solution of hydrochloric acid, nitric acid and AlCl$_3$, thereby carrying out surface roughening treatment. In this way, an etched aluminum foil 21 having the rough surface (etched surface) 201 in FIG. 5A was obtained (Step S1).

The etched aluminum foil 21 (see FIG. 5A) was subjected as described below to surface treatment in the aerosol deposition chamber illustrated in FIG. 2 in accordance with the flow in FIG. 6.

The rolled aluminum foil 21 prepared in Step S1 was affixed to a stage 304 which is movable in the X and Y directions within the film-forming chamber 303 (Step S2).

The interior of the film-forming chamber 303 was evacuated using a vacuum pump 306, thereby lowering the pressure beforehand to 10 Pa or below (Step S3).

In a separate operation, ultrafine ceramic particles of barium titanate having an average particle size of 100 nm were placed in an aerosol generator 301A as the starting powder 300, ultrasound was applied to the entire aerosol generator 301A by an oscillator 301B, and degassing in vacuum was carried out for 30 minutes while heating at about 150° C., thereby effecting pretreatment in which moisture that had formed on the powder surface is removed (Step S4).

High-purity helium gas (gas pressure, 2 kg/cm$^2$; gas flow rate, 10 L/min) 302 was introduced into the aerosol generator 301A, and the pretreated starting powder 300 was aerosolized (Step S5).

Next, this aerosol was passed through a pipe and delivered to the film-forming chamber 303 by a nozzle 305. The nozzle 305 used was one having a helical groove formed on the inside. Spraying was carried out for 3 minutes from a nozzle 305 having a helical groove on the inside toward the aluminum foil substrate 21 (Step S6). The pressure within the chamber at this time was fixed at 500 Pa.

The ceramic (barium titanate) film, which was formed of fine particles on the top surface of the aluminum foil substrate 21 by aerosol deposition in this way, had a thickness of 2 μm.

It is also possible to form a ceramic film on both sides of the aluminum foil substrate 21 by the same procedure.

Next, conversion treatment was carried out in an aqueous solution of ammonium adipate (Step S8).

The etching treatment (Step S7) in FIG. 2 was omitted in this third embodiment as well.

The dielectric oxide film layer 200 formed by the above treatment steps illustrated in FIG. 6 was then subjected to leakage current measurement 30 minutes after reaching a predetermined voltage of 20 V. The tensile strength of the film was also measured.

Tensile strength measurement was performed by cutting out test pieces having a width of 1 cm and a length of 5 cm, and subjecting them to strain on a tensile testing machine at a test rate of 10 mm/min. If the strength at break was 1.5 kg/cm (not normalized by thickness; this value is specified based on the two-dimensional shape of the test piece) or more, the piece was rated as acceptable.

Fourth Embodiment
(An Embodiment in which a Film of a Mixture of Fine Ceramic Particles and Fine Aluminum Particles is Formed on Etched Aluminum Foil)

Figure 7:
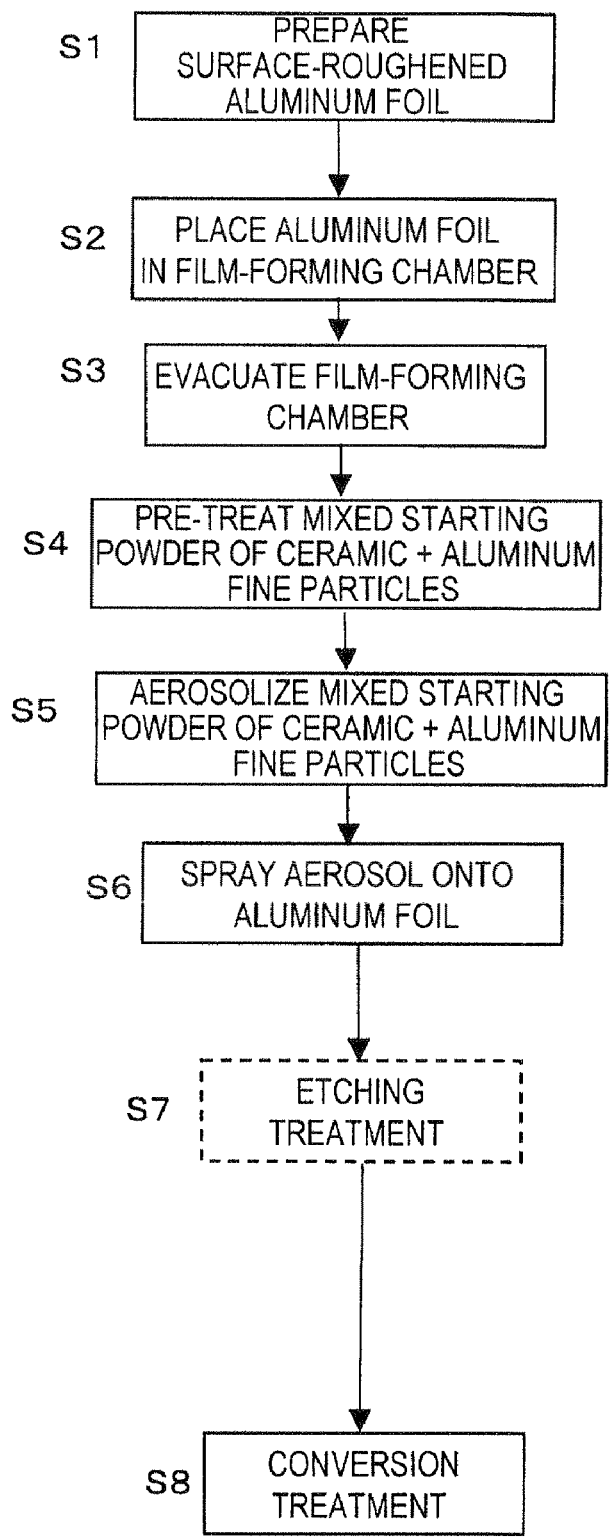
FIG. 7 is a flow chart illustrating the sequence of steps in a method of manufacturing an electrode foil in a fourth embodiment according to the invention.

FIG. 7 is a flow chart illustrating the sequence of steps in a method of manufacturing an electrode foil in a fourth embodiment according to the invention. As in the above second and third embodiments, 99% aluminum foil having a thickness of 40 μm obtained by rolling was annealed at 300° C. in an inert gas, thereby carrying out pretreatment was carried out. This foil was electrolytically treated for 8 minutes at a current density of 0.2 A/m$^2$ (50 Hz) in an aqueous solution of hydrochloric acid, nitric acid and AlCl$_3$, thereby carrying out surface roughening treatment. In this way, an aluminum foil 21 having the etched surface 201 in FIG. 5A was obtained (Step S1).

The etched aluminum foil 21 (see FIG. 5A) was subjected as described below to surface treatment in the aerosol deposition chamber illustrated in FIG. 2 in accordance with the flow chart in FIG. 7.

The rolled aluminum foil 21 prepared in Step S1 was affixed to a stage 304 which is movable in the X and Y directions within the film-forming chamber 303 (Step S2).

The interior of the film-forming chamber 303 was evacuated using a vacuum pump 306, thereby lowering the pressure beforehand to 10 Pa or below (Step S3).

In a separate operation, a mixture of ultrafine ceramic particles of barium titanate having an average particle size of 100 nm and ultrafine aluminum powder having an average particle size of 8 μm was placed in an aerosol generator 301A as the starting powder 300, ultrasound was applied to the entire aerosol generator 301A by an oscillator 301B, and degassing in vacuum was carried out for 30 minutes while heating at about 150° C., thereby effecting pretreatment in which moisture that had formed on the powder surface is removed (Step S4).

High-purity helium gas (gas pressure, 2 kg/cm$^2$; gas flow rate, 10 L/min) 302 was introduced into the aerosol generator 301A, and the pretreated starting powder 300 was aerosolized (Step S5).

Next, this aerosol was passed through a pipe and delivered to the film-forming chamber 303 by a nozzle 305. The nozzle 305 used was one having a helical groove formed on the inside. Spraying was carried out for 3 minutes from a nozzle 305 having a helical groove on the inside toward the aluminum foil substrate 21 (Step S6). The pressure within the chamber at this time was fixed at 500 Pa.

Figure 8:
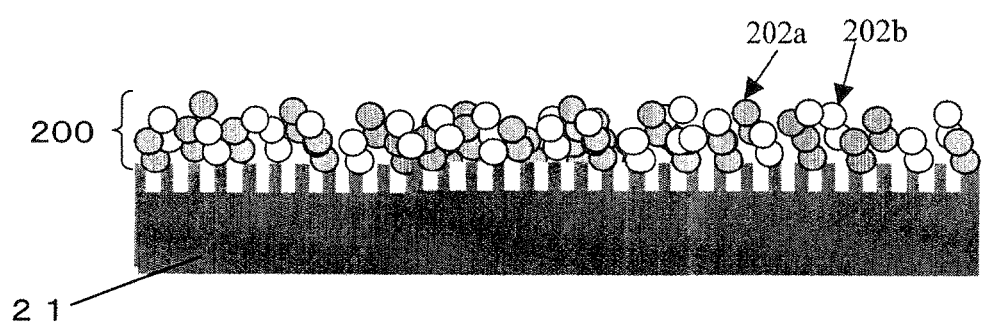
FIG. 8 is a diagram illustrating a ceramic (barium titanate)-aluminum film formed on the top surface of an aluminum foil substrate according to the fourth embodiment.

In this way, the ceramic (barium titanate)-aluminum film 200, which was formed of fine particles of ceramic 202$a$ and fine particles of aluminum 202$b$ on the top surface of the aluminum foil substrate 21 by aerosol deposition as illustrated in FIG. 8, had a thickness of 20 μm.

It is also possible to form a ceramic (barium titanate)—aluminum film on both sides of the aluminum foil substrate 21 by the same procedure.

Next, conversion treatment was carried out in an aqueous solution of ammonium adipate (Step S8).

The etching treatment (Step S7) in FIG. 2 was omitted in this fourth embodiment as well.

The dielectric oxide film layer 200 formed by the above treatment steps illustrated in FIG. 7 was then subjected to leakage current measurement 30 minutes after reaching a predetermined voltage of 20 V. The tensile strength of the film was also measured.

The tensile strength was measured by cutting out test pieces having a width of 1 cm and a length of 5 cm, and subjecting them to strain on a tensile testing machine at a test rate of 10 mm/min. If the strength at break was 1.5 kg/cm (not normalized by thickness; this value is specified based on the two-dimensional shape of the test piece) or more, the piece was rated as acceptable.

COMPARATIVE EXAMPLE

A comparative example for comparison with the above first to fourth embodiments was carried out as follows.

Aluminum foil (99%) having a thickness of 40 μm obtained by rolling was annealed at 300° C. in an inert gas, thereby carrying out pretreatment. This foil was electrolytically treated for 8 minutes at a current density of 0.2 μm² (50 Hz) in an aqueous solution of hydrochloric acid, nitric acid and $AlCl_3$, thereby carrying out surface roughening treatment. Next, conversion treatment in an aqueous solution of ammonium adipate was carried out.

That is, in the comparative example, the roughening treatment by means of film formation with fine particles of aluminum or fine particles of ceramic, of Steps S2 to 57 in the treatment sequence of the first embodiment, was not carried out.

The leakage current 30 minutes after reaching a predetermined voltage of 20 V was measured. In addition, the tensile strength of the film was measured.

Tensile strength measurement was performed by cutting out test pieces having a width of 1 cm and a length of 5 cm, and subjecting them to strain on a tensile testing machine at a test rate of 10 mm/min. If the strength at break was 1.5 kg/cm (not normalized by thickness; this value is specified based on the two-dimensional shape of the test piece) or more, the piece was rated as acceptable. In addition, the tensile strength of the film was measured.

Table 1 below is a table comparing the above first to fourth embodiments and the comparative example.

In Table 1, the second to fourth embodiments, the foils of which are obtained by forming a deposited layer by the aerosol deposition method of the invention on a prior-art etched aluminum foil, are compared with the comparative example.

The tensile strength of the foils in the first to fourth embodiments are higher than in the comparative example. The electrostatic capacitance per unit surface area in the second to fourth embodiments was from 150 to 180 μF, which was about four times the value of 40 μF in the comparative example.

This invention thus makes it possible to provide electrolytic capacitors having an electrostatic capacitance about four times that of prior-art electrolytic capacitors.

Another advantage is that the kind and mixing ratio of valve metal particles that are deposited may be adjusted after taking into consideration the relationship between the voltage resistance and capacitance of the films obtained by the aerosol deposition process. Of course, a single kind of valve metal may be deposited alone.

The electrostatic capacitance per unit surface area was obtained by measuring the electrostatic capacitance in an aqueous solution of ammonium adipate.

TABLE 1

| | | | Comparison of Capacitance in Foil Alone | | |
|---|---|---|---|---|---|
| | | Film structure | Tensile strength (kg/cm) of foil after conversion treatment, 80 μm thick | Leakage current 30 minutes after reaching 20 V (μA/5 cm²) | Electrostatic capacitance (μF/cm²) |
| Present invention | First embodiment | Aluminum aerosol deposition film on flat rolled aluminum foil | 2.5 | 0.9 | 100 |
| | Second embodiment | Aluminum aerosol deposition film on etched aluminum foil | 2.0 | 1.1 | 150 |
| | Third embodiment | Ceramic aerosol deposition film on etched aluminum foil | 2.0 | 3.4 | 180 |
| | Fourth embodiment | Ceramic and aluminum mixture aerosol deposition film on etched aluminum foil | 2.0 | 2.5 | 165 |
| Comparative example | Comparative example | Aluminum foil etched structure | 1.5 | 1.0 | 40 |

(B) Electrolytic Capacitor

FIG. 9 is a schematic view illustrating the structure of a coiled electrolytic capacitor serving as an embodiment in which the invention is employed.

Figures 9A, 9B:
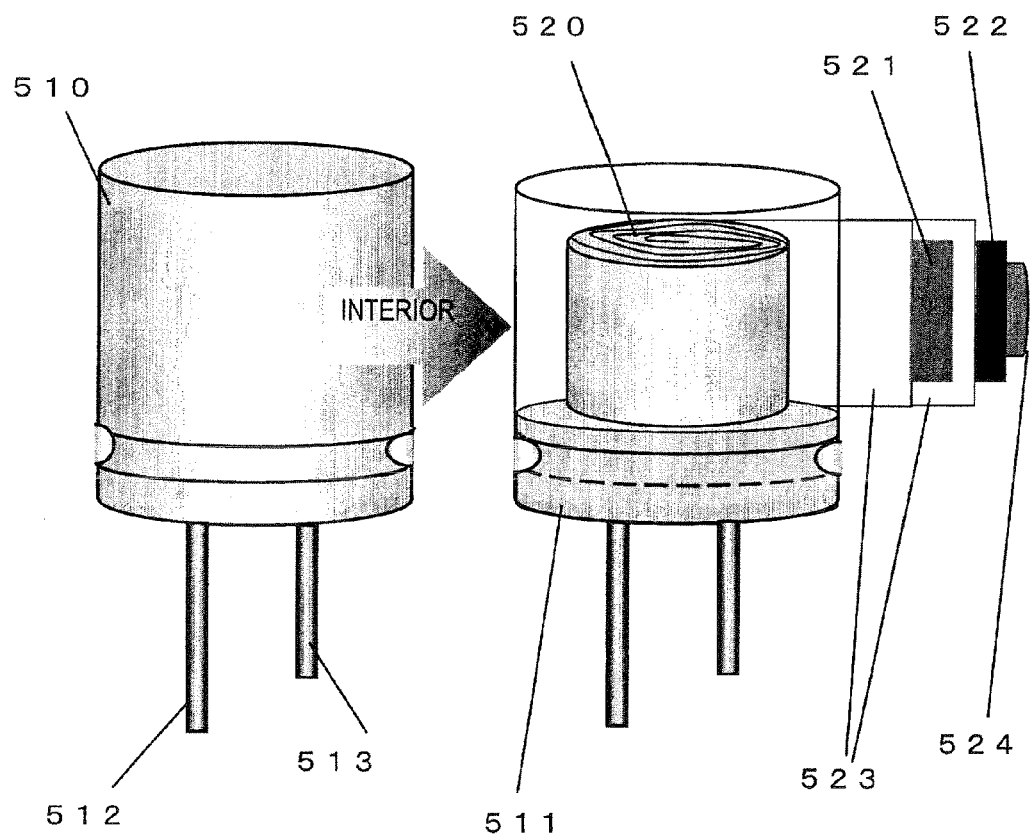
FIG. 9 is a schematic view illustrating the structure of a coiled electrolytic capacitor serving as an embodiment in which the invention is employed.

FIG. 9A illustrates the outside appearance of the capacitor, and FIG. 9B illustrates a perspective view to the interior with the housing (metal case) 510 removed. An anodic electrode lead 512 and a cathodic electrode lead 513 are fixed to a sealant (insulating resin) 511.

A wound capacitor element 520 is fixed to the sealant (insulating resin) 511 within the housing (metal case) 510, and the anodic electrode lead 512 and the cathodic electrode lead 513 are electrically connected to, respectively, an anode foil 521 and a cathode foil 522.

The anode foil 521 and the cathode foil 522 are cylindrically wound with electrolytic paper 523 as a separator therebetween, and the final ends of the foils are fixed with tape 524 to maintain the coiled state.

The electrolytic capacitor of the invention achieves a higher capacitance than electrolytic capacitors of prior-art constructions which use an etched electrode foil obtained by electrolytically etching the aluminum foil intended for use as the anode foil.

The inventive electrolytic capacitor is characterized by uniformly dispersing in a high-velocity gas an ultrafine powder of metal, or an ultrafine powder of metal in combination with an ultrafine powder having a high dielectric constant or an ultrafine powder of valve metal that has been oxidized at the surface, and spraying the resulting gas onto the surface of the etched electrode foil serving as the target so as to form a formed film of ultrafine powder.

In this way, compared with prior-art etched electrode foil of aluminum foil alone, electrode foil in which the surface area of aluminum has been increased may be obtained in electrode foil of the same thickness. Moreover, a formed film of ultrafine powder that has been additionally formed on the surface of the etched electrode foil may be electrolytically etched.

With such treatments, compared with a conventional etched electrode foil composed of aluminum foil alone, electrode foil in which the surface area of aluminum has been further enlarged may be employed in electrode foil of the same thickness.

Owing to this characteristic constitution of the invention, it is possible to provide an electrolytic capacitor which is smaller in size and has a higher capacitance.

The characteristics of the invention will be specifically described with reference to examples.

Figure 10:
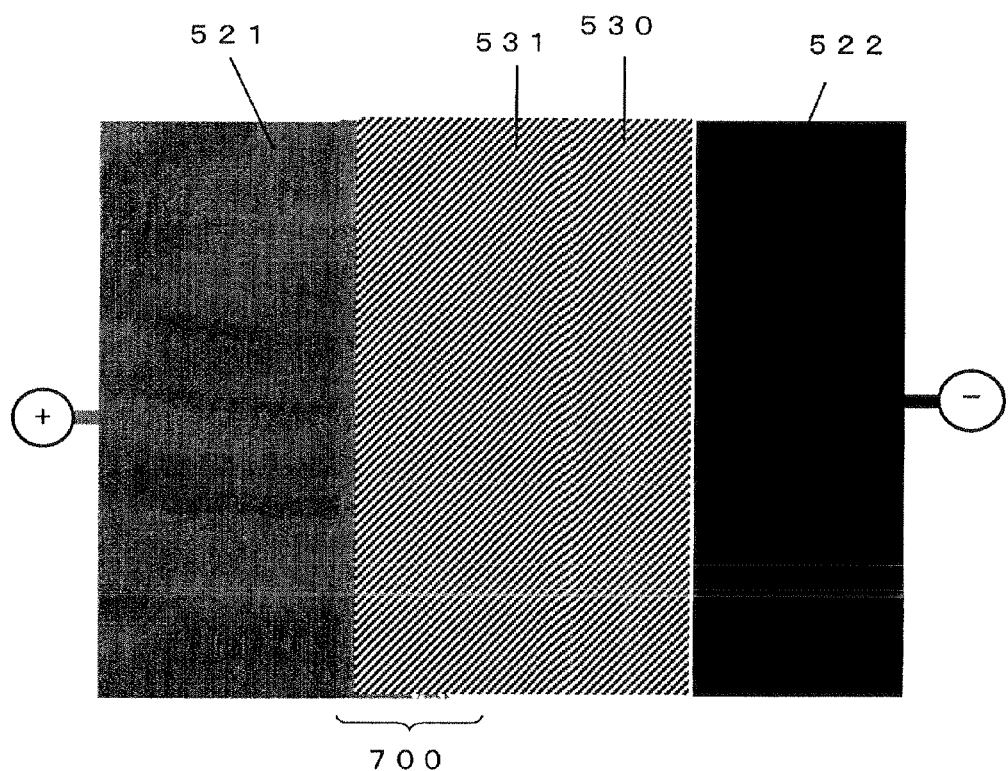
FIG. 10 is a schematic view illustrating the cross-sectional structure of the coiled capacitor element in FIG. 9.

FIG. 10 is a schematic view illustrating the cross-sectional structure of the coiled capacitor element 520 in FIG. 9. The anode foil 521 and the cathode foil 522 are placed one over the another with an electrolytic paper 530 impregnated with electrolyte 531 as the separator interposed therebetween.

The cathode foil 522 may be constructed so as to include at least one from among electrolytic paper, carbon, metal foil, metal particles and electrically conductive resin.

In addition, an electrolytic solution obtained by dissolving an organic acid salt or an inorganic acid salt in a protic solution may be used as the electrolyte 531. Moreover, a solid electrolytic capacitor may be obtained by using, as specific examples of the electrolyte 531, at least one solid electrolyte from among polythiophene-type, polypyrrole-type and polyaniline-type conductive polymers, and TCNQ complex salts.

Here, the electrolytic capacitor according to the invention has the characteristic in particular that a dielectric oxide film layer 700 is formed on the surface of the anode foil 521.

First Method of Forming Anode Foil

Figure 11:
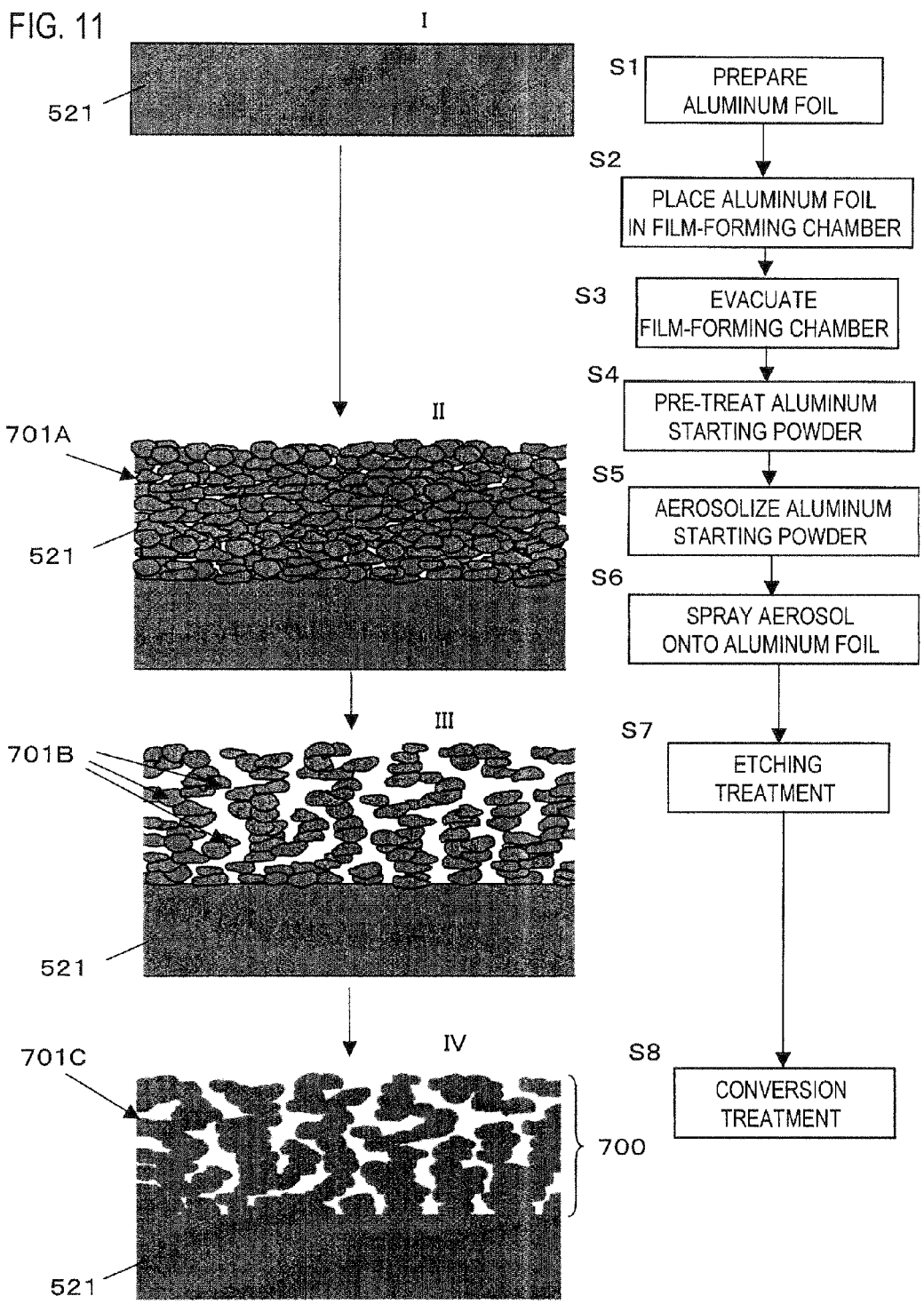
FIG. 11 is a diagram illustrating the sequence of steps in a method of forming a dielectric oxide film layer on the surface of an anode foil in a fifth embodiment.

FIG. 11 is a diagram illustrating the sequence of steps in a forming method of a fifth embodiment of a dielectric oxide film layer 700 on the surface of an anode foil 521. Figures depicting the states corresponding to the treatment steps are illustrated on the left side of the flow chart.

Aluminum foil 521 (purity, 99%) having a thickness of 40 μm was prepared by rolling (Step S1: State I).

Figure 12:
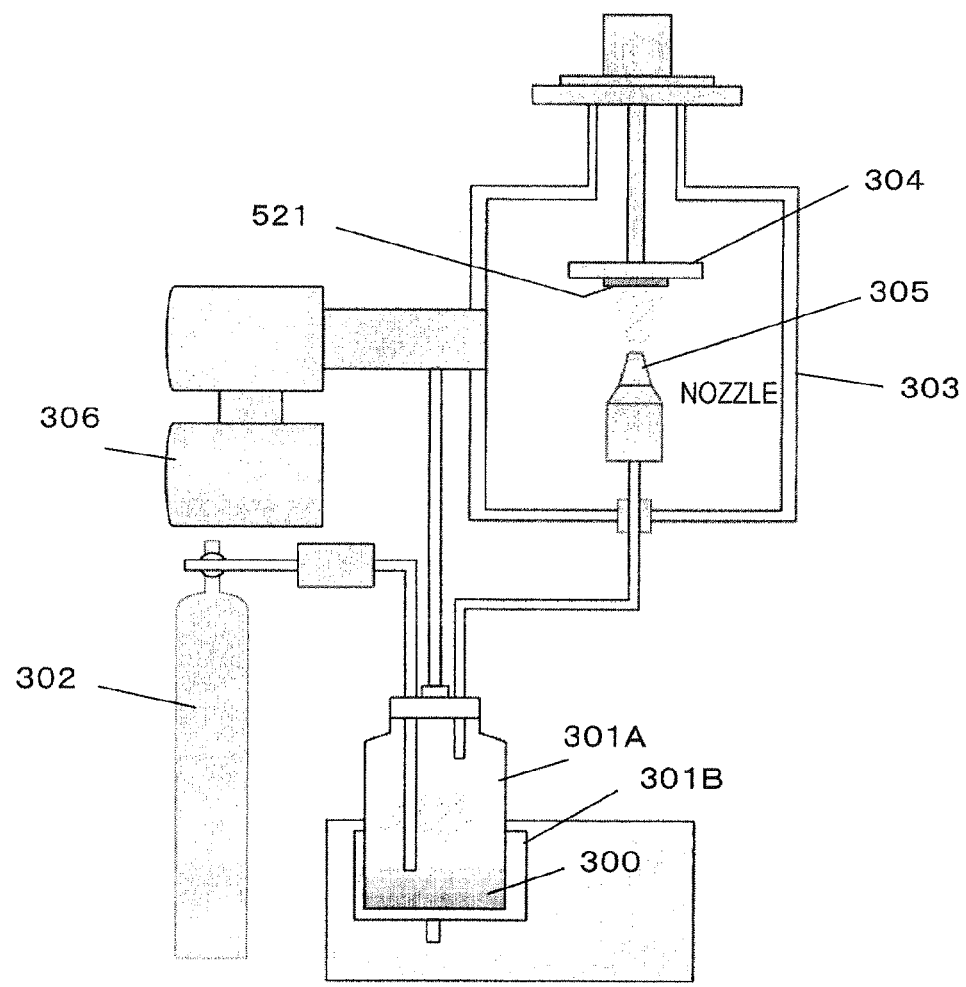
FIG. 12 is a schematic diagram of an exemplary aerosol deposition chamber configuration.

Surface treatment on the aluminum foil 521 thus prepared was carried out as follows in the aerosol deposition chamber. FIG. 12 is a schematic diagram of an exemplary aerosol deposition chamber configuration.

A film-forming chamber 303 has a stage 304 which is movable in the X and Y directions in the interior thereof. The rolled aluminum foil 521 prepared in Step S1 is affixed to the stage 304 (Step S2).

The interior of the film-forming chamber 303 was evacuated using a vacuum pump 306, thereby lowering the pressure beforehand to 10 Pa or below (Step S3).

In a separate operation, a starting powder 300 composed primarily of a powder of aluminum, which is valve metal, having an average particle size of 8 μm was placed in an aerosol generator 301A, ultrasound was applied to the entire aerosol generator 301A by an oscillator 301B, and degassing in vacuum was carried out for 30 minutes while heating at about 150° C., thereby effecting pretreatment in which moisture that had formed on the powder surface is removed (Step S4).

High-purity helium gas (gas pressure, 2 kg/cm$^2$; gas flow rate, 10 L/min) 302 was introduced into the aerosol generator 301A, and the pretreated starting powder 300 was aerosolized (Step S5).

Next, this aerosol was passed through a pipe and delivered to the film-forming chamber 303 by a nozzle 305. The nozzle 305 used was one having a helical groove formed on the inside. Spraying was carried out for 3 minutes from a nozzle 305 having a helical groove on the inside toward the aluminum foil substrate 521 (Step S6). The pressure within the chamber at this time was fixed at 500 Pa.

The aluminum film 701A, which was formed of fine particles of aluminum on the top surface of the aluminum foil substrate 521 by aerosol deposition in this way, had a thickness of 20 μm (State II: aerosol deposition with fine aluminum particles).

It is also possible to form an aluminum film on both sides of the aluminum foil substrate 521 by the same procedure.

Next, annealing the deposited aluminum metal particles in an inert gas at 300° C., which is a temperature at or below the melting point of aluminum+100° C., thereby carrying out sintering pretreatment in which the deposited aluminum metal particles are densified. This foil was electrolytically treated for 8 minutes in an aqueous solution of hydrochloric acid, nitric acid and AlCl$_3$ at a current density of 0.2 A/m$^2$ (50 Hz), thereby carrying out roughening treatment (etching) (Step S7). This etching treatment resulted in the formation of a microcavity layer 701B (State III).

Next, conversion treatment was carried out in an aqueous solution of ammonium borate/ammonium adipate (Step S8). Such treatment enlarges the surface area by forming a microcavity layer 701B, in addition to which the surface 701C of the microcavity layer 701B is oxidized by conversion treatment in Step S8, resulting in the formation of a dielectric oxide film layer 700 having a large dielectric constant on the surface of the aluminum foil substrate 521 (State IV).

Second Method of Forming Anode Foil

Figure 13A:
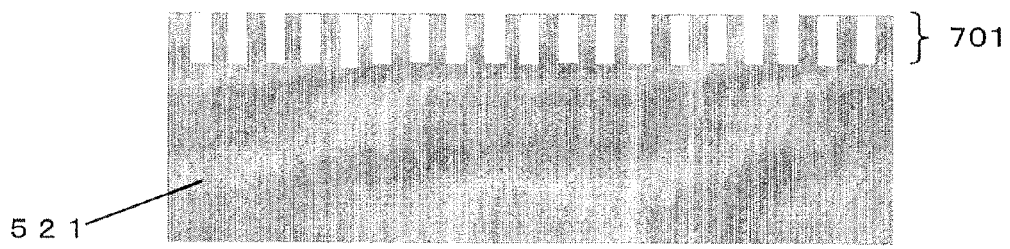
FIG. 13A is a diagram illustrating etched aluminum foil having a rough, pre-etched surface.

In the embodiment according to the flow chart in FIG. 11 above, an example was described in which 99% aluminum foil substrate having a thickness of 40 μm obtained by rolling was used as the anode foil 521. In addition, as a sixth embodiment, an etched aluminum foil with a rough surface (etched surface) 701 subjected beforehand to etching treatment as illustrated in FIG. 13A, which has also been used in the prior art, may be used.

Figure 14:
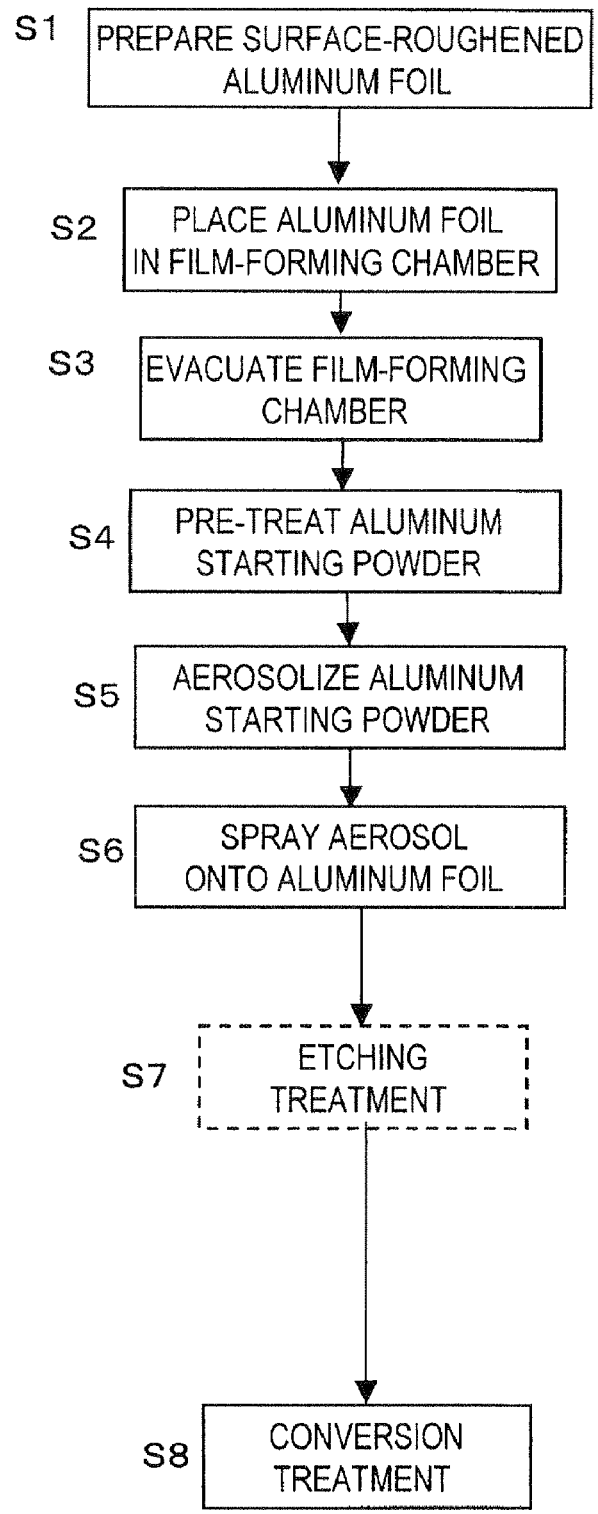
FIG. 14 is a flow chart illustrating the sequence of steps in a method of manufacturing an electrode foil in a sixth embodiment according to the invention.

FIG. 14 is a flow chart illustrating the sequence of steps in a method of manufacturing an electrode foil in a sixth embodiment according to the invention.

That is, 99% aluminum foil having a thickness of 40 μm obtained by rolling was annealed at 300° C. in an inert gas, thereby carrying out pretreatment. This foil was electrolytically treated for 8 minutes at a current density of 0.2 A/m² (50 Hz) in an aqueous solution of hydrochloric acid, nitric acid and $AlCl_3$, thereby carrying out surface roughening treatment. In this way, an aluminum foil 521 having the etched surface 701 illustrated in the aluminum foil cross-section in FIG. 13A was obtained (Step S1).

Next, the roughened aluminum foil was subjected to the treatments in Steps S2 to S8 in the same way as the treatment sequence in FIG. 10 explained earlier for the fifth embodiment. However, the etching treatment in Step S7 of FIG. 10 was omitted.

It is also possible to form an aluminum film on both sides of the etched aluminum foil by the above procedure.

Figure 13B:
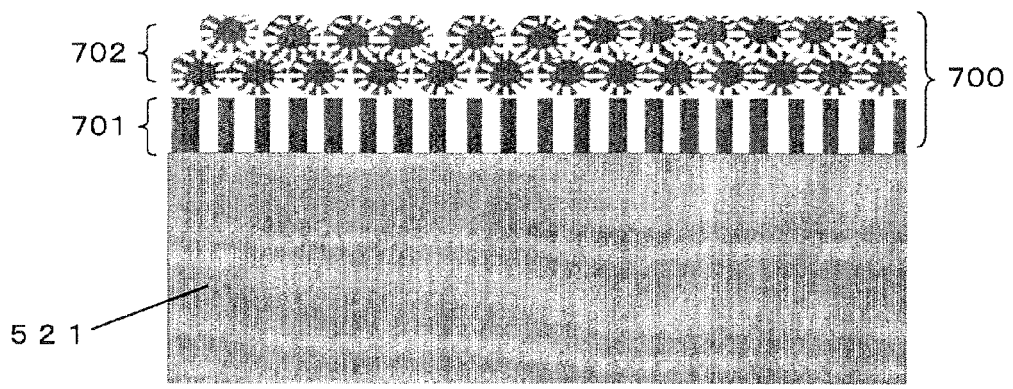
FIG. 13B is a diagram illustrating a layer of deposited fine aluminum particles obtained by aerosol deposition.

FIG. 13B schematically illustrates the cross-section of a layer 702 obtained as described above using aerosol deposition to deposit fine particles of aluminum on the rough surface 701 subjected to etching treatment beforehand.

Third Method of Forming Anode Foil

Figure 15:
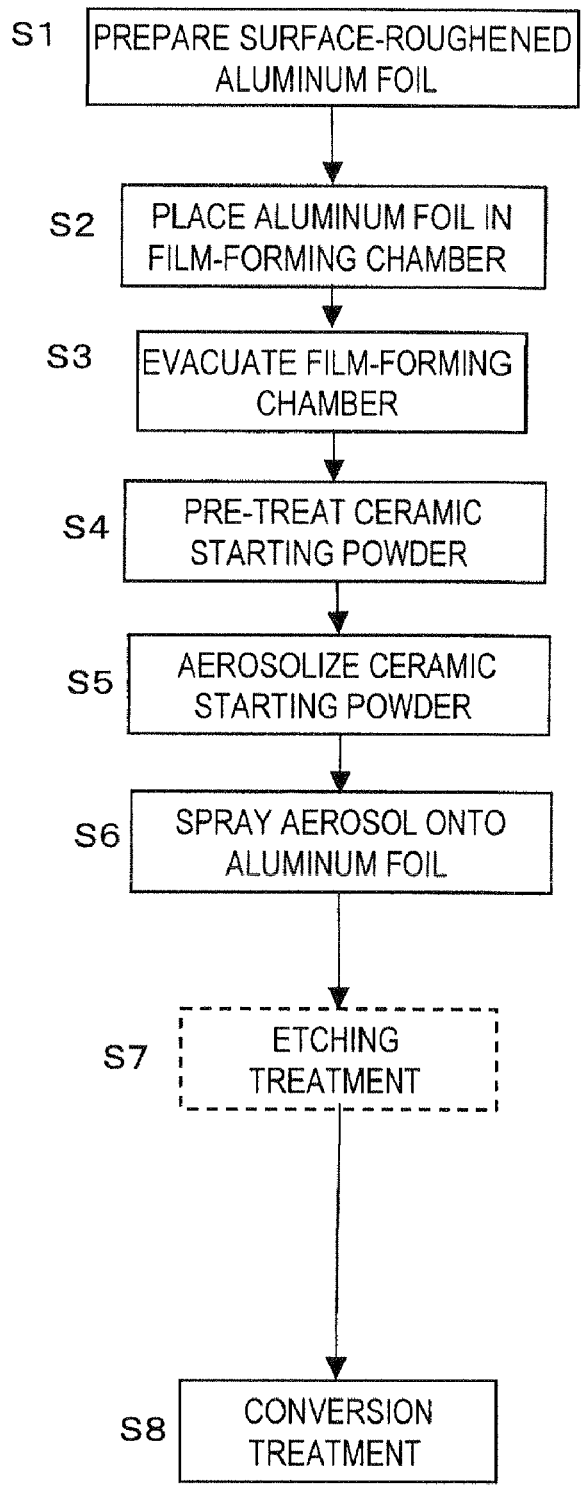
FIG. 15 is a flow chart illustrating the sequence of steps in a method of manufacturing an electrode foil in a seventh embodiment according to the invention.

FIG. 15 is a flow chart illustrating the sequence of steps in a method of manufacturing an electrode foil in a seventh embodiment according to the invention. As in the sixth embodiment, 99% aluminum foil having a thickness of 40 μm obtained by rolling was annealed at 300° C. in an inert gas, thereby carrying out pretreatment. This foil was electrolytically treated for 8 minutes at a current density of 0.2 A/m² (50 Hz) in an aqueous solution of hydrochloric acid, nitric acid and $AlCl_3$, thereby carrying out surface roughening treatment. In this way, an etched aluminum foil 521 having the rough surface (etched surface) 701 in FIG. 13A was obtained (Step S1).

The etched aluminum foil 521 (see FIG. 13A) was subjected as described below to surface treatment in the aerosol deposition chamber illustrated in FIG. 12 in accordance with the flow chart in FIG. 15.

The rolled aluminum foil 521 prepared in Step S1 was affixed to a stage 304 which is movable in the X and Y directions within the film-forming chamber 303 (Step S2).

The interior of the film-forming chamber 303 was evacuated using a vacuum pump 306, thereby lowering the pressure beforehand to 10 Pa or below (Step S3).

In a separate operation, ultrafine ceramic particles of barium titanate having an average particle size of 100 nm were placed in an aerosol generator 301A as the starting powder 300, ultrasound was applied to the entire aerosol generator 301A by an oscillator 301B, and degassing in vacuum was carried out for 30 minutes while heating at about 150° C., thereby effecting pretreatment in which moisture that had formed on the powder surface is removed (Step S4).

High-purity helium gas (gas pressure, 2 kg/cm²; gas flow rate, 10 L/min) 302 was introduced into the aerosol generator 301A, and the pretreated starting powder 300 was aerosolized (Step S5).

Next, this aerosol was passed through a pipe and delivered to the film-forming chamber 303 by a nozzle 305. The nozzle 305 used was one having a helical groove formed on the inside. Spraying was carried out for 3 minutes from a nozzle 305 having a helical groove on the inside toward the aluminum foil substrate 521 (Step S6). The pressure within the chamber at this time was fixed at 500 Pa.

The ceramic (barium titanate) film, which was formed of fine particles on the top surface of the aluminum foil substrate 521 by aerosol deposition in this way, had a thickness of 2 μm.

It is also possible to form a ceramic film on both sides of the aluminum foil substrate 521 by the same procedure.

Next, conversion treatment was carried out in an aqueous solution of ammonium adipate (Step S8).

The etching treatment (Step S7) in FIG. 10 was omitted in this seventh embodiment as well.

Fourth Method of Forming Anode Foil

Figure 16:
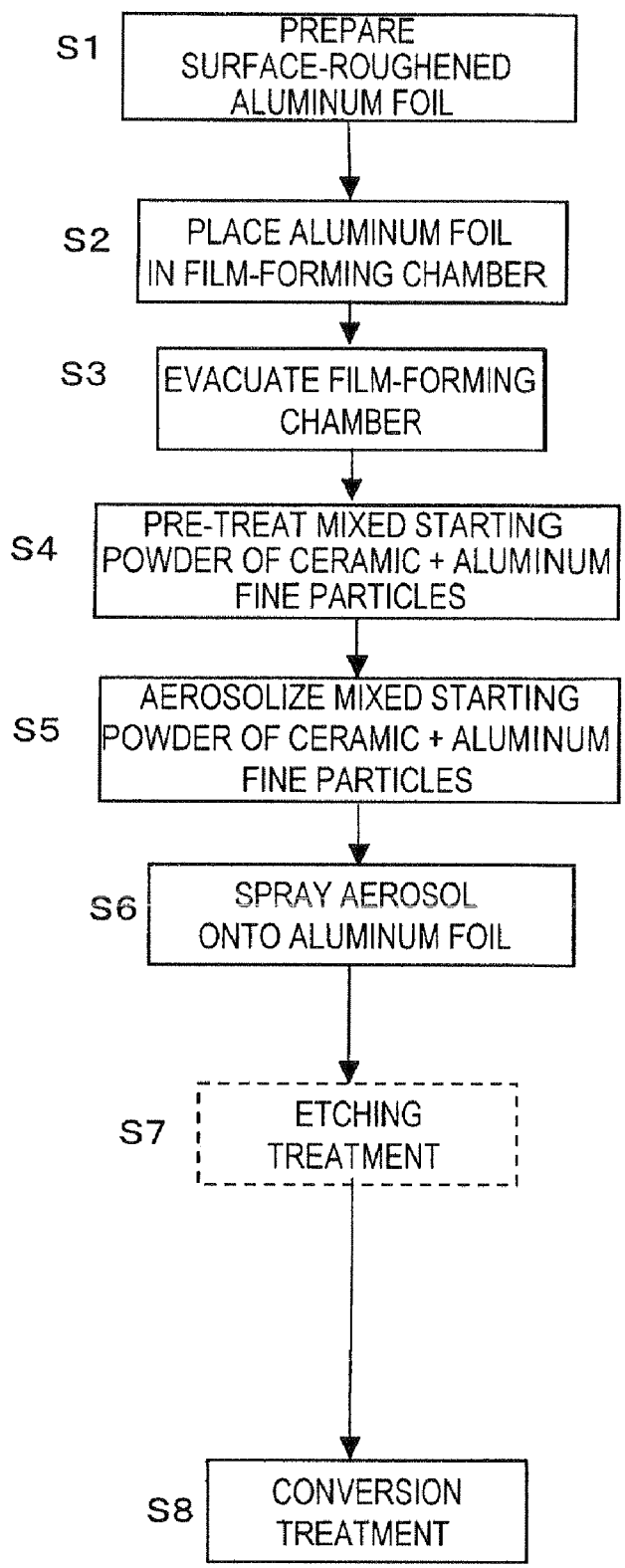
FIG. 16 is a flow chart illustrating the sequence of steps in a method of manufacturing an electrode foil in an eighth embodiment according to the invention. This diagram illustrates an eighth embodiment of a dielectric oxide film layer.

FIG. 16 is a flow chart illustrating the sequence of steps in a method of manufacturing an electrode foil in an eighth embodiment according to the invention. As in the above sixth and seventh embodiments, 99% aluminum foil having a thickness of 40 μm obtained by rolling was annealed at 300° C. in an inert gas, thereby carrying out pretreatment. This foil was electrolytically treated for 8 minutes at a current density of 0.2 A/m² (50 Hz) in an aqueous solution of hydrochloric acid, nitric acid and $AlCl_3$, thereby carrying out surface roughening treatment. In this way, an etched aluminum foil 521 having the rough surface 701 in FIG. 13A was obtained (Step S1).

The etched aluminum foil 521 (see FIG. 13A) was subjected as described below to surface treatment in the aerosol deposition chamber illustrated in FIG. 12 in accordance with the flow chart in FIG. 15.

The rolled aluminum foil 521 prepared in Step S1 was affixed to a stage 304 which is movable in the X and Y directions within the film-forming chamber 303 (Step S2).

The interior of the film-forming chamber 303 was evacuated using a vacuum pump 306, thereby lowering the pressure beforehand to 10 Pa or below (Step S3).

In a separate operation, a mixture of ultrafine ceramic particles of barium titanate having an average particle size of 100 nm and an ultrafine aluminum powder having an average particle size of 8 μm was placed in an aerosol generator 301A as the starting powder 300, ultrasound was applied to the entire aerosol generator 301A by an oscillator 301B, and degassing in vacuum was carried out for 30 minutes while heating at about 150° C., thereby effecting pretreatment in which moisture that had formed on the powder surface is removed (Step S4).

High-purity helium gas (gas pressure, 2 kg/cm²; gas flow rate, 10 L/min) 302 was introduced into the aerosol generator 301A, and the pretreated starting powder 300 was aerosolized (Step S5).

Next, this aerosol was passed through a pipe and delivered to the film-forming chamber 303 by a nozzle 305. The nozzle 305 used was one having a helical groove formed on the inside. Spraying was carried out for 3 minutes from a nozzle 305 having a helical groove on the inside toward the aluminum foil substrate 521 (Step S6). The pressure within the chamber at this time was fixed at 500 Pa.

Figure 17A:
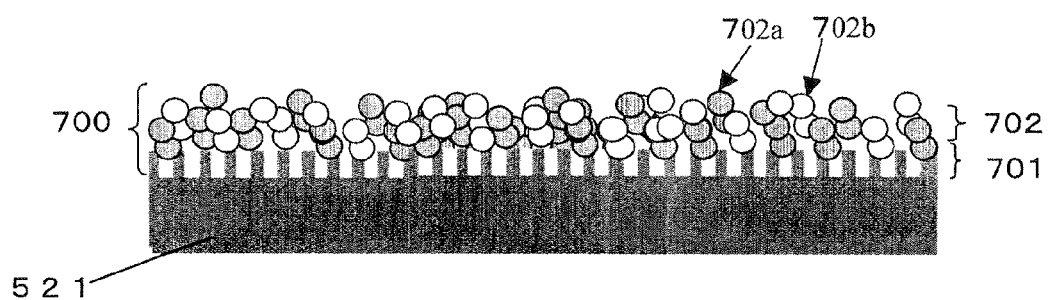
FIG. 17A is a diagram illustrating a ceramic (barium titanate)-aluminum film formed by aerosol deposition on the rough surface of an aluminum foil substrate.

In this way, the ceramic (barium titanate)-aluminum film 702, which was formed of fine particles of ceramic 702a and fine particles of aluminum 702b on the rough surface 701 of the aluminum foil substrate 521 by aerosol deposition as illustrated in FIG. 17A, had a thickness of 20 μm.

It is also possible to form a ceramic (barium titanate) ceramic-aluminum film on both sides of the aluminum foil substrate 521 by the same procedure.

Conversion treatment was then carried out in an aqueous solution of ammonium adipate (Step S8).

Next, by carrying out heat treatment followed by conversion treatment corresponding to Step S4 in FIG. 11, a strong anode foil 521 on the surface of which had been formed an aluminum oxide layer 701B was formed, and a dielectric oxide film layer 700 was formed. The etching treatment (Step S7) in FIG. 11 was omitted in this eighth embodiment as well.

In the above embodiments, due to the rough surface 701 that has been etched beforehand and the deposited layer 702 of aluminum particles (valve metal particles 702a) and barium titanate particles (ceramic particles 702b) deposited thereon, a larger surface area is obtained, enabling the electrostatic capacitance to be enlarged as well.

Figure 17B:
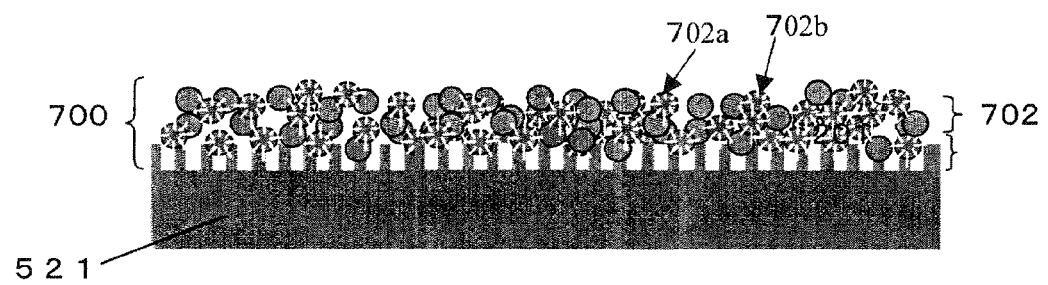
FIG. 17B is a diagram illustrating etching treatment of the ceramic (barium titanate)-aluminum film of FIG. 17A.

Also, as illustrated in FIG. 17B, by carrying out the etching treatment in Step S7 of FIG. 11 and thereby etching interparticle regions and the particles having weak bond strengths in the aerosol deposition film 702, a porous aluminum structure may be obtained.

Here, particles which include at least one from among valve metal aluminum and compounds thereof, titanium and compounds thereof, tantalum and compounds thereof, and niobium and compounds thereof may be used as the valve metal particles 702a.

Also, materials composed of an oxide, a nitride, or a carbide with a dielectric constant of at least 10 may be used as the ceramic particles 702b, aside from barium titanate particles.

FIGS. 18A, 18B, 19A and 19B are diagrams illustrating examples in which the capacitor element produced using the aerosol deposition process of the invention is employed, not in coiled electrolytic capacitors illustrated in FIG. 9, but in multilayer and single-layer electrolytic capacitors.

Figure 18A:
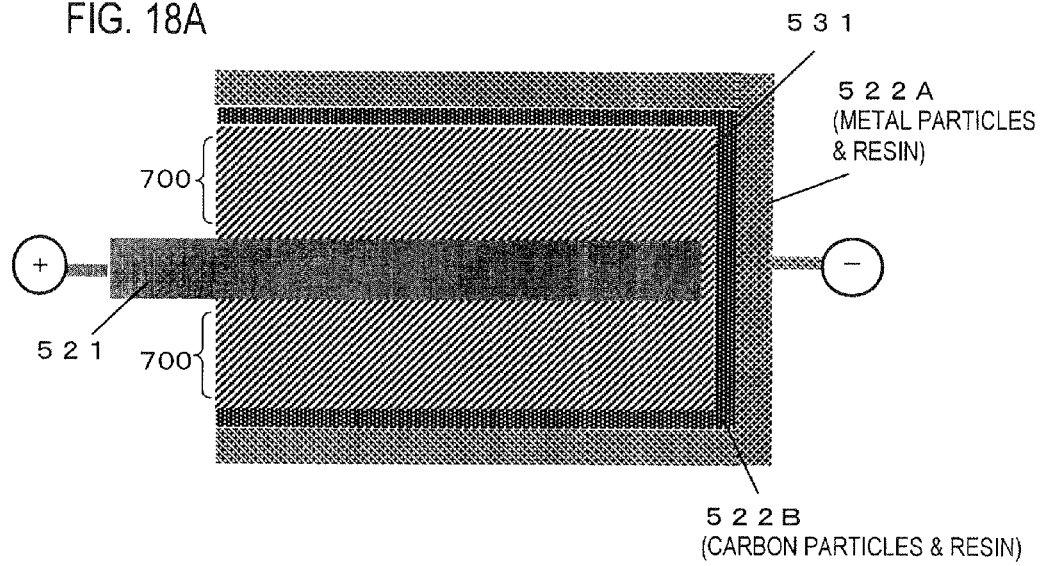
FIG. 18A is a schematic diagram illustrating the cross-sectional structure at the interior of a two-terminal unit capacitor element.

FIG. 18A is a schematic diagram illustrating the cross-sectional structure at the interior of a two-terminal unit capacitor element 600.

A dielectric oxide film layer 700 is formed on both sides of an anode foil 521. An anode terminal 512 is connected to one end of the anode foil 521. A cathode foil 522 has a two-layer structure including a layer 522A containing metal particles and resin and a layer 522B containing carbon particles and resin. The cathode foil 522 having the two-layer structure is formed so as to surround one end and both sides of the anode foil 521.

Figure 18B:
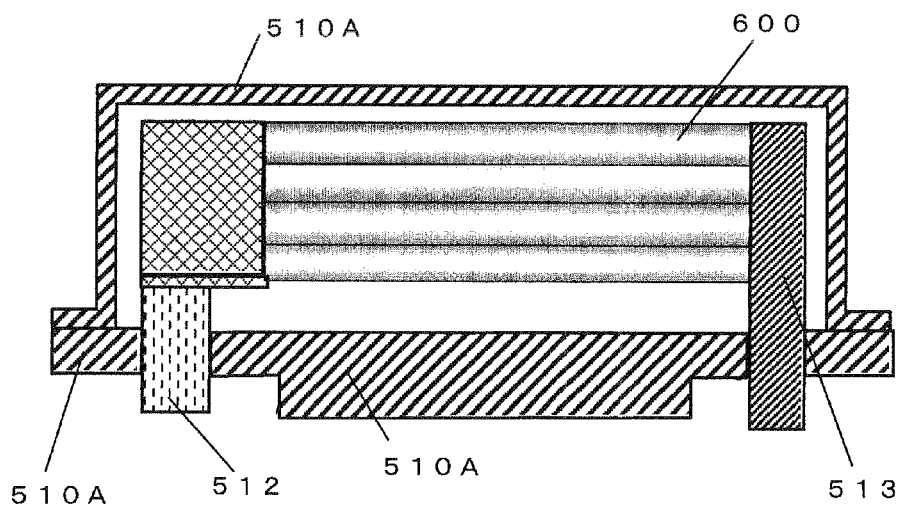
FIG. 18B is a cross-sectional view of an electrolytic capacitor in which the unit capacitor elements of FIG. 18A are stacked.

FIG. 18B is a cross-sectional view of an electrolytic capacitor in which the unit capacitor elements 600 of FIG. 18A are stacked. A housing 510A is formed of a insulating case, and the exposed anode foils 521 of stacked unit capacitor elements 600 are connected in common at one end to an anodic electrode terminal 512.

The metal particle and resin-containing layers 522A of the stacked unit capacitor elements 600 are electrically connected in common to the cathode electrode terminal 513.

In this way, an electrolytic capacitor having a two-terminal construction is formed.

Figure 19A:
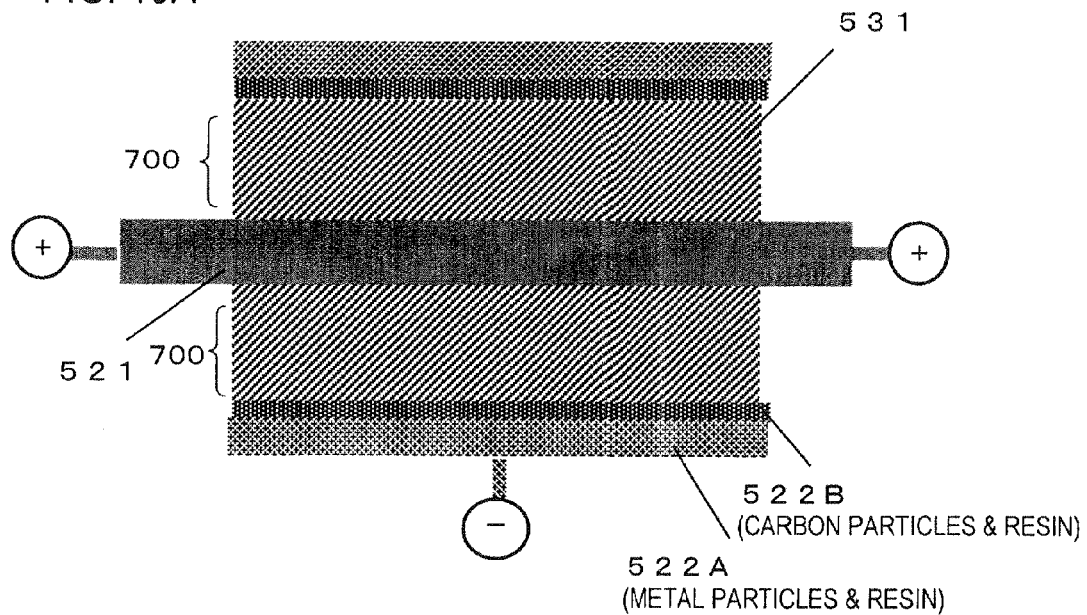
FIG. 19A is a schematic diagram illustrating the cross-sectional structure at the interior of a three-terminal unit capacitor element.

FIG. 19A is a schematic diagram illustrating the cross-sectional structure at the interior of a three-terminal unit capacitor element 600.

Dielectric oxide film layers 700 are formed on both sides of an anode foil 521. The anode foil 521 is connected at both ends thereof to anode terminals 512. A cathode foil 522 has a two-layer structure composed of a layer 522A containing metal particles and resin and a layer 522B containing carbon particles and resin. Cathode foils 522 having the two-layer structure are formed so as to surround the dielectric oxide film layers 700, with the anode foil 521 at the center.

Figure 19B:
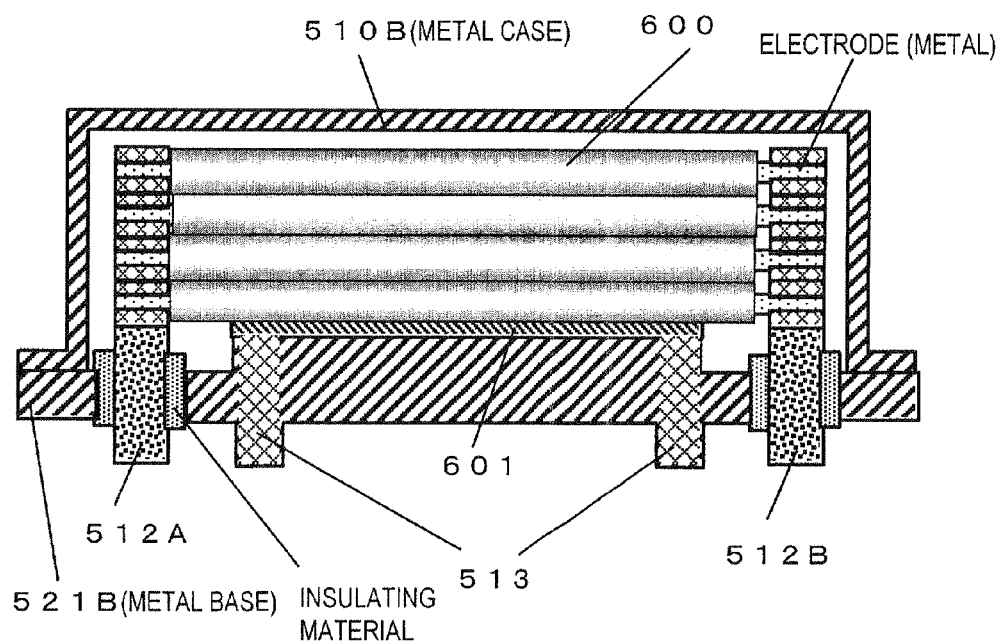
FIG. 19B is a cross-sectional view of an electrolytic capacitor in which the unit capacitor elements of FIG. 19A are stacked.

FIG. 19B is a cross-sectional view of an electrolytic capacitor in which the unit capacitor elements 600 of FIG. 19A are stacked. A housing 510B is formed of an electrically conductive metal case. Both ends of the anode foil 521 in the stacked unit capacitor elements 600 are connected in common to the respective anodic electrode terminals 512A and 512B.

The cathodic electrode terminals 13 are electrically connected to the metal particle and resin-containing cathode foil layers 522A of the unit capacitor elements 600 through an electrically conductive resin 601 which fixes in place the stacked unit capacitor elements 600. By this means, the three-terminal type electrolytic capacitor is formed.

Table 2 compares the effects that arise as a result of differences in the structure of the dielectric oxide film layer 700 in electrolytic capacitors that are formed using an anode foil 521 on which the above dielectric oxide film layer 700 according to the invention was formed.

In Table 2 below, a comparative example for the above fifth to eighth embodiments was carried as follows.

Aluminum foil (99%) having a thickness of 40 μm obtained by rolling was annealed at 300° C. in an inert gas, thereby carrying out pretreatment. This foil was electrolytically treated for 8 minutes at a current density of 0.2 A/m$^2$ (50 Hz) in an aqueous solution of hydrochloric acid, nitric acid and AlCl$_3$, thereby carrying out surface roughening treatment. Conversion treatment in an aqueous solution of ammonium adipate was subsequently carried out.

That is, the comparative example does not carry out the roughening treatment by film formation with fine particles of aluminum or fine particles of ceramic in Steps S2 to S7 of the treatment sequence in the fifth embodiment.

In addition, the leakage current 30 minutes after a predetermined voltage of 20 V had been reached was measured for anode foil formed in each of the embodiments. The tensile strength of the film was also measured.

The tensile strength at this time was measured by cutting out test pieces having a width of 1 cm and a length of 5 cm, and subjecting them to strain on a tensile testing machine at a test rate of 10 mm/min. If the strength at break was 1.5 kg/cm (not normalized by thickness; this value is specified based on the two-dimensional shape of the test piece) or more, the piece was rated as acceptable. In addition, the tensile strength of the film foil was measured.

The electrostatic capacitance per unit surface area was the electrostatic capacitance measured in an aqueous solution of ammonium adipate.

TABLE 2

Comparison of Capacitance in Foil Alone

|  |  | Film structure | Tensile strength (kg/cm) of foil after conversion treatment, 80 μm thick | Leakage current 30 minutes after reaching 20 V (μA/5 cm$^2$) | Electrostatic capacitance (μF/cm$^2$) |
|---|---|---|---|---|---|
| Present invention | Fifth embodiment | Aluminum aerosol deposition film on flat rolled aluminum foil | 2.5 | 0.9 | 100 |
|  | Sixth embodiment | Aluminum aerosol deposition film on etched aluminum foil | 2.0 | 1.1 | 150 |
|  | Seventh embodiment | Ceramic aerosol deposition film on etched aluminum foil | 2.0 | 3.4 | 180 |
|  | Eighth embodiment | Ceramic and aluminum mixture aerosol deposition film on etched aluminum foil | 2.0 | 2.5 | 165 |
| Comparative example | Comparative Example 2 | Aluminum foil etched structure | 1.5 | 1.0 | 40 |

In above Table 2, the tensile strengths of the foils of the sixth to eighth embodiments are higher than in Comparative Example 2. The electrostatic capacitance per unit surface area in the sixth to eighth embodiments was from 150 to 180 μF, which was about four times the value of 40 μF in Comparative Example 2.

This invention thus makes it possible to provide electrolytic capacitors having an electrostatic capacitance about four times that of prior-art electrolytic capacitors.

Another advantage is that the kind and mixing ratio of valve metal particles that are deposited may be adjusted after taking into consideration the relationship between the voltage resistance and capacitance of the films obtained by the aerosol deposition process, or a single type of valve metal may be deposited alone.

The ultrafine particle ceramic of barium titanate used in these embodiments are subjected beforehand to 5 hours of heat treatment at 900° C. This enables a film structure having few impurities to be formed.

Hence, it is preferable to subject the fine particles used in the aerosol deposition process to pretreatment, and more preferable to subject the fine particles to heat treatment at a temperature not less than the temperature at which the impurities decompose.

Global fine particles produced by atomization are used in these embodiments as the powder of ultrafine particles of aluminum. It was possible in this way to achieve good deposition due to a large strain during an aerosol deposition process.

Accordingly, by using global fine particles having a particle shape that is nearly spherical, a film structure that is both dense and porous may be achieved.

Industrial Applicability

In the electrolytic capacitor according to the present invention, because the anode foil has an increased capacitance while retaining strength, it is possible to achieve an increased capacitance, both in a coiled electrolytic capacitor without breakage in the connections to the anodic and cathodic electrode metals, and also in a multilayer electrolytic capacitor without foil failure during stacking. Accordingly the present invention makes a significant contribution to the industry.

What is claimed is:

1. An electrode foil comprising particles, stacked on a surface of a metal foil, wherein:
    the particles primarily include at least one of valve metal particles having a dielectric constant and ceramic particles, and
    a microcavity layer is formed in a structure in which the particles are stacked.

2. The electrode foil according to claim 1, wherein at least one of the valve metal particles and the ceramic particles are deposited using aerosol deposition.

3. The electrode foil according to claim 1, wherein the valve metal particles have a particle size in a range of from 100 nm to 100 μm.

4. The electrode foil according to claim 1, wherein the valve metal particles include at least one from among valve metal aluminum and compounds thereof, titanium and compounds thereof, tantalum and compounds thereof, and niobium and compounds thereof.

5. A method for manufacturing an electrode foil, comprising:
    placing an aluminum foil in a film-forming chamber of an aerosol chamber;
    aerosolizing aluminum powder; and
    spraying the aerosolized aluminum powder onto the aluminum foil placed in the film-forming chamber so as to deposit aluminum particles on the aluminum foil.

6. The method for manufacturing an electrode foil according to claim 5, wherein a surface of the aluminum foil placed in the film-forming chamber is roughened by electrolytic etching treatment.

7. The method for manufacturing an electrode foil according to claim 5, wherein a surface of the aluminum foil on which the aluminum particles have been deposited is subjected to etching treatment.

8. The method for manufacturing an electrode foil according to claim 7, wherein the surface on which the aluminum particles have been deposited and which has been subjected to the etching treatment is further subjected to conversion treatment.

9. An electrolytic capacitor comprising:
    an anode foil composed of a metal with a valve action, a cathode layer, and an electrolyte layer interposed between the anode foil and the cathode layer, wherein the anode foil has on a surface thereof a dielectric oxide film layer including particles having a dielectric constant, in which the particles are stacked so as to have small gaps therebetween.

10. The electrolytic capacitor according to claim 9, wherein the dielectric oxide film layer formed by depositing particles having a dielectric constant is formed using an aerosol deposition process.

11. The electrolytic capacitor according to claim 9, wherein the anode foil is a flat rolled aluminum foil or an aluminum foil having a rough, etched surface; and
the particles having a dielectric constant in layer stacked on the anode foil are valve metal particles composed primarily of a valve metal.

12. The electrolytic capacitor according to claim 11, wherein the valve metal includes at least one from among valve metal aluminum and compounds thereof, titanium and compounds thereof, tantalum and compounds thereof, and niobium and compounds thereof.

13. The electrolytic capacitor according to claim 11, wherein the anode foil and the layer deposited are subjected to conversion treatment so as to form a metal oxide layer.

14. The electrolytic capacitor of claim 11, wherein the valve metal particles have a particle size in a range of from 100 nm to 100 μm.

15. The electrolytic capacitor according to claim 9, wherein an electrolyte of the electrolyte layer is an electrolyte solution prepared by dissolving an organic acid salt or an inorganic acid salt in a protic solvent.

16. The electrolytic capacitor of claim 9, wherein at least one solid electrolyte from among polythiophene-type polymer, polypyrrole-type polymer, polyaniline-type conductive polymers, and TCNQ complex salts is used as the electrolyte in the electrolyte layer.

17. The electrolytic capacitor of claim 9, wherein the cathode layer includes at least any one of electrolytic paper, carbon, metal foil, metal particles and conductive resins.

18. An electrode foil for use in a capacitor, comprising a layer including metal particles on a metal foil surface, wherein metal particles are stacked so as to have small gaps therebetween; and
the metal particles are surface treated.

19. The electrode foil according to claim 18, wherein an oxide film is formed by the surface treatment.

20. A capacitor comprising an electrode foil,
the electrode foil comprising a layer including metal particles on a metal foil surface, wherein metal particles are stacked so as to have small gaps therebetween; and
the metal particles are surface treated.

* * * * *